(12) United States Patent  (10) Patent No.: US 9,183,493 B2
Richert et al.  (45) Date of Patent: Nov. 10, 2015

(54) ADAPTIVE PLASTICITY APPARATUS AND METHODS FOR SPIKING NEURON NETWORK

(71) Applicant: Brain Corporation, San Diego, CA (US)

(72) Inventors: Micah Richert, San Diego, CA (US); Botond Szatmary, Hungary, CA (US)

(73) Assignee: Brain Corporation, San Diego, CA (US)

( * ) Notice: Subject to any disclaimer, the term of this patent is extended or adjusted under 35 U.S.C. 154(b) by 430 days.

(21) Appl. No.: 13/660,923

(22) Filed: Oct. 25, 2012

(65) Prior Publication Data

US 2014/0122397 A1  May 1, 2014

(51) Int. Cl.
G06N 5/00 (2006.01)
G06F 1/00 (2006.01)
G06N 3/04 (2006.01)
G06N 3/02 (2006.01)

(52) U.S. Cl.
CPC . *G06N 3/049* (2013.01); *G06N 3/02* (2013.01)

(58) Field of Classification Search
CPC ........... G06N 3/02; G06N 3/049; G06N 3/08; G06N 3/063
See application file for complete search history.

(56) References Cited

U.S. PATENT DOCUMENTS

| | | | |
|---|---|---|---|
| 5,063,603 A | 11/1991 | Burt | |
| 5,138,447 A | 8/1992 | Shen et al. | |
| 5,216,752 A | 6/1993 | Tam | |
| 5,272,535 A | 12/1993 | Elabd | |
| 5,355,435 A | 10/1994 | Deyong et al. | |
| 5,638,359 A | 6/1997 | Peltola et al. | |
| 5,652,594 A | 7/1997 | Costas | |
| 5,673,367 A | 9/1997 | Buckley | |
| 5,875,108 A | 2/1999 | Hoffberg | |

(Continued)

FOREIGN PATENT DOCUMENTS

CN 102226740 A 10/2011
JP 4087423 3/1992

(Continued)

OTHER PUBLICATIONS

Berkes and Wiskott, Slow feature analysis yields a rich repertoire of complex cell properties. *Journal of Vision* (2005) vol. 5 (6).

(Continued)

*Primary Examiner* — Jeffrey A Gaffin
*Assistant Examiner* — Kalpana Bharadwaj
(74) *Attorney, Agent, or Firm* — Gazdzinski & Associates PC

(57) ABSTRACT

Apparatus and methods for plasticity in a spiking neuron network. In one implementation, a plasticity mechanism is configured based on a similarity measure between neuron post-synaptic and pre-synaptic activity. The similarity measure may comprise a cross-correlogram between the output spike train and input spike train, determined over a plasticity window. Several correlograms, corresponding to individual input connections delivering pre-synaptic input, may be combined. The combination may comprise for example a weighted average. The averaged correlograms may be used to construct the long term potentiation component of the plasticity. The long term depression component of the plasticity may comprise e.g., a monotonic function based on a statistical parameter associated with the adaptively determined long term potentiation component.

24 Claims, 12 Drawing Sheets

(56) References Cited

U.S. PATENT DOCUMENTS

| | | | |
|---|---|---|---|
| 6,009,418 A | 12/1999 | Cooper | |
| 6,014,653 A | 1/2000 | Thaler | |
| 6,035,389 A | 3/2000 | Grochowski | |
| 6,418,424 B1 | 7/2002 | Hoffberg et al. | |
| 6,458,157 B1 | 10/2002 | Suaning | |
| 6,509,854 B1 | 1/2003 | Morita | |
| 6,545,705 B1 | 4/2003 | Sigel et al. | |
| 6,545,708 B1 | 4/2003 | Tamayama | |
| 6,546,291 B2 | 4/2003 | Merfeld et al. | |
| 6,581,046 B1 | 6/2003 | Ahissar | |
| 6,625,317 B1 | 9/2003 | Gaffin et al. | |
| 7,054,850 B2 | 5/2006 | Matsugu | |
| 7,580,907 B1 | 8/2009 | Rhodes | |
| 7,653,255 B2 | 1/2010 | Rastogi | |
| 7,737,933 B2 | 6/2010 | Yamano et al. | |
| 7,765,029 B2 | 7/2010 | Fleischer et al. | |
| 7,849,030 B2 | 12/2010 | Ellingsworth | |
| 8,000,967 B2 | 8/2011 | Taleb | |
| 8,015,130 B2 | 9/2011 | Matsugu | |
| 8,103,602 B2 | 1/2012 | Izhikevich | |
| 8,154,436 B2 | 4/2012 | Szajnowski | |
| 8,160,354 B2 | 4/2012 | Paquier | |
| 8,200,593 B2 | 6/2012 | Guillen | |
| 8,281,997 B2 | 10/2012 | Moran et al. | |
| 8,311,965 B2 | 11/2012 | Breitwisch | |
| 8,315,305 B2 | 11/2012 | Petre | |
| 8,346,692 B2 | 1/2013 | Rouat et al. | |
| 8,390,707 B2 | 3/2013 | Yamashita | |
| 8,416,847 B2 | 4/2013 | Roman | |
| 8,467,623 B2 | 6/2013 | Izhikevich | |
| 8,583,286 B2 | 11/2013 | Fleischer et al. | |
| 8,712,941 B2 | 4/2014 | Izhikevich et al. | |
| 2003/0050903 A1 | 3/2003 | Liaw | |
| 2003/0216919 A1 | 11/2003 | Roushar | |
| 2004/0136439 A1 | 7/2004 | Dewberry | |
| 2004/0170330 A1 | 9/2004 | Fogg | |
| 2004/0193670 A1 | 9/2004 | Langan et al. | |
| 2004/0220082 A1* | 11/2004 | Surmeier et al. | 514/2 |
| 2005/0015351 A1 | 1/2005 | Nugent | |
| 2005/0036649 A1 | 2/2005 | Yokono et al. | |
| 2005/0283450 A1 | 12/2005 | Matsugu | |
| 2006/0094001 A1 | 5/2006 | Torre | |
| 2006/0129728 A1 | 6/2006 | Hampel | |
| 2006/0161218 A1 | 7/2006 | Danilov | |
| 2007/0022068 A1 | 1/2007 | Linsker | |
| 2007/0176643 A1 | 8/2007 | Nugent | |
| 2007/0208678 A1 | 9/2007 | Matsugu | |
| 2008/0100482 A1 | 5/2008 | Lazar | |
| 2008/0199072 A1 | 8/2008 | Kondo | |
| 2008/0201282 A1 | 8/2008 | Garcia et al. | |
| 2008/0237446 A1 | 10/2008 | Oshikubo | |
| 2009/0043722 A1 | 2/2009 | Nugent | |
| 2010/0036457 A1 | 2/2010 | Sarpeshkar | |
| 2010/0081958 A1 | 4/2010 | She | |
| 2010/0086171 A1 | 4/2010 | Lapstun | |
| 2010/0100482 A1 | 4/2010 | Hardt | |
| 2010/0166320 A1 | 7/2010 | Paquier | |
| 2010/0225824 A1 | 9/2010 | Lazar | |
| 2010/0235310 A1 | 9/2010 | Gage et al. | |
| 2010/0299296 A1 | 11/2010 | Modha et al. | |
| 2011/0016071 A1 | 1/2011 | Guillen | |
| 2011/0119214 A1 | 5/2011 | Breitwisch | |
| 2011/0119215 A1 | 5/2011 | Elmegreen | |
| 2011/0137843 A1 | 6/2011 | Poon et al. | |
| 2011/0160741 A1 | 6/2011 | Asano | |
| 2012/0011090 A1 | 1/2012 | Tang | |
| 2012/0083982 A1 | 4/2012 | Bonefas | |
| 2012/0084240 A1 | 4/2012 | Esser et al. | |
| 2012/0109866 A1 | 5/2012 | Modha | |
| 2012/0303091 A1 | 11/2012 | Izhikevich | |
| 2012/0308076 A1 | 12/2012 | Piekniewski | |
| 2012/0308136 A1 | 12/2012 | Izhikevich | |
| 2013/0046716 A1 | 2/2013 | Chan et al. | |
| 2013/0073484 A1 | 3/2013 | Izhikevich | |
| 2013/0073491 A1 | 3/2013 | Izhikevich | |
| 2013/0073492 A1 | 3/2013 | Izhikevich | |
| 2013/0073495 A1 | 3/2013 | Izhikevich | |
| 2013/0073496 A1 | 3/2013 | Szatmary | |
| 2013/0073498 A1 | 3/2013 | Izhikevich | |
| 2013/0073499 A1 | 3/2013 | Izhikevich | |
| 2013/0073500 A1 | 3/2013 | Szatmary | |
| 2013/0117212 A1 | 5/2013 | Hunzinger et al. | |
| 2013/0151450 A1 | 6/2013 | Ponulak | |
| 2013/0218821 A1 | 8/2013 | Szatmary | |
| 2013/0251278 A1 | 9/2013 | Izhikevich | |
| 2013/0297539 A1 | 11/2013 | Piekniewski et al. | |
| 2013/0297541 A1 | 11/2013 | Piekniewski et al. | |
| 2013/0297542 A1 | 11/2013 | Piekniewski et al. | |
| 2013/0325766 A1 | 12/2013 | Petre et al. | |
| 2013/0325768 A1* | 12/2013 | Sinyayskiy et al. | 706/16 |
| 2013/0325773 A1 | 12/2013 | Sinyavskiy | |
| 2013/0325774 A1 | 12/2013 | Sinyavskiy | |
| 2013/0325775 A1 | 12/2013 | Sinyavskiy | |
| 2013/0325777 A1 | 12/2013 | Petre et al. | |
| 2014/0012788 A1 | 1/2014 | Piekniewski | |
| 2014/0016858 A1 | 1/2014 | Richert | |
| 2014/0032458 A1 | 1/2014 | Sinyavskiy | |
| 2014/0032459 A1 | 1/2014 | Sinyavskiy | |
| 2014/0052679 A1 | 2/2014 | Sinyavskiy | |
| 2014/0064609 A1 | 3/2014 | Petre et al. | |
| 2014/0122397 A1 | 5/2014 | Richert | |
| 2014/0122398 A1 | 5/2014 | Richert | |
| 2014/0122399 A1 | 5/2014 | Szatmary | |
| 2014/0156574 A1 | 6/2014 | Piekniewski | |

FOREIGN PATENT DOCUMENTS

| | | |
|---|---|---|
| RU | 2108612 C1 | 10/1998 |
| RU | 2406105 C2 | 12/2010 |
| RU | 2424561 C2 | 7/2011 |
| WO | 2008083335 A2 | 7/2008 |
| WO | 2008132066 A1 | 11/2008 |

OTHER PUBLICATIONS

Bohte, 'Spiking Nueral Networks' Doctorate at the University of Leiden, Holland, Mar. 5, 2003, pp. 1-133 [retrieved on Nov. 14, 2012]. Retrieved from the internet: <URL: http://holnepagcs,cwi ,n11-sbolltedmblica6ond)hdthesislxif>.

Brette et al., Brian: a simple and flexible simulator for spiking neural networks, The Neuromorphic Engineer, Jul. 1,2009, pp. 1-4, doi: 10.2417/1200906.1659.

Cessac et al. 'Overview of facts and issues about neural coding by spikes.' Journal of Physiology, Paris 104.1 (2010): 5.

Cuntz et al., 'One Rule to Grow Them All: A General Theory of Neuronal Branching and Its Paractical Application' PLOS Computational Biology, 6 (8), Published Aug. 5, 2010.

Davison et al., PyNN: a common interface for neuronal network simulators. Frontiers in Neuroinformatics, Jan. 2009, pp. 1-10, vol. 2, Article 11.

Djurfeldt, Mikael, The Connection-set Algebra: a formalism for the representation of connectivity structure in neuronal network models, implementations in Python and C++, and their use in simulators BMC Neuroscience Jul. 18, 2011 p. 1 12(Suppl 1):P80.

Dorval et al. 'Probability distributions of the logarithm of inter-spike intervals yield accurate entropy estimates from small datasets.' Journal of neuroscience methods 173.1 (2008): 129.

Fidjeland et al., 'Accelerated Simulation of Spiking Neural Networks Using GPUs [online],2010 [retrieved on Jun. 15, 2013], Retrieved from the Internet: URL:http://ieeexplore.ieee.org/xpls/abs_all. jsp?ammber=5596678&tag=1.

Field, G.; Chichilnisky, E., Information Processing in the Primate Retina: Circuitry and Coding. *Annual Review of Neuroscience*, 2007, 30(1), 1-30.

Fiete, et al., Spike-Time-Dependent Plasticity and Heterosynaptic Competition Organize Networks to Produce Long Scale-Free Sequences of Neural Activity. *Neuron 65*, Feb. 25, 2010, pp. 563-576.

Floreano et al., 'Neuroevolution: from architectures to learning' Evol. Intel. Jan 2008 1:47-62, [retrieved Dec. 30, 2013] [retrieved

(56) References Cited

OTHER PUBLICATIONS online from URL:<http://inforscience.epfl.ch/record/112676/files/FloreanoDuerrMattiussi2008.p df>.

Földiak, P., Learning invariance from transformation sequences. *Neural Computation*, 1991, 3(2), 194-200.

Froemke et al., 'Temporal modulation of spike-timing-dependent plasticity, Frontiers in Synaptic Neuroscience, vol. 2, Article 19, pp. 1-16 [online] Jun. 2010 [retrieved on Dec. 16, 2013]. Retrieved from the internet: <frontiersin.org>.

Gerstner et al. (1996) A neuronal learning rule for sub-millisecond temporal coding. *Nature* vol. 383 (6595) pp. 76-78.

Gewaltig et al., 'NEST (Neural Simulation Tool)', Scholarpedia, 2007, pp. 1-15, 2(4): 1430, dol: 1 0.4249/scholarpedia.1430.

Gleeson et al., NeuroML: A Language for Describing Data Driven Models of Neurons and Networks with a High Degree of Biological Detail, PLoS Computational Biology, Jun. 2010, pp. 1-19 vol. 6 Issue 6.

Gluck, Stimulus Generalization and Representation in Adaptive Network Models of Category Learning [online], 1991 [retrieved on Aug. 24, 2013]. Retrieved from the Internet:<URL:http:// www.google.com/url?sa=t&rct=j&q=Giuck+%22STIMULUS+GENERALIZATION+AND+REPRESENTATION+N+1 N+ADAPTIVE+NETWORK+MODELS+OF+CATEGORY+LEARNING%22+ 1991.

Gollisch et al. 'Rapid neural coding in the retina with relative spike latencies.' Science 319.5866 (2008): 11 08-1111.

Goodman et al., Brian: a simulator for spiking neural networks in Python, Frontiers in Neuroinformatics, Nov. 2008, pp. 1-10, vol. 2, Article 5.

Gorchetchnikov et al., NineML: declarative, mathematically-explicit descriptions of spiking neuronal networks, Frontiers in Neuroinformatics, Conference Abstract: 4th INCF Congress of Neuroinformatics, doi: 1 0.3389/conf fninf.2011.08.00098.

Graham, Lyle J., The Surf-Hippo Reference Manual, http:// www.neurophys.biomedicale.univparis5. fr/-graham/surf-hippo-files/Surf-Hippo%20Reference%20Manual.pdf, Mar. 2002, pp. 1-128.

Hopfield JJ (1995) Pattern recognition computation using action potential timing for stimulus representation. *Nature* 376: 33-36.

Izhikevich E. M. and Hoppensteadt F.C. (2009) Polychronous Wavefront Computations. *International Journal of Bifurcation and Chaos*, 19:1733-1739.

Izhikevich E.M. (2004) Which Model to Use for Cortical Spiking Neurons? *IEEE Transactions on Neural Networks*, 15:1063-1070.

Izhikevich E.M. (2006) Polychronization: Computation With Spikes. *Neural Computation*,18:245-282.

Izhikevich et al., 'Relating STDP to BCM', Neural Computation (2003) 15, 1511-1523.

Izhikevich, E.M. (2007) Dynamical Systems in Neuroscience: The Geometry of Excitability and Bursting, *The MIT Press*, 2007.

Izhikevich, 'Simple Model of Spiking Neurons', IEEE Transactions on Neural Networks, vol. 14, No. 6, Nov. 2003, pp. 1569-1572.

Janowitz, M.K.; Van Rossum, M.C.W. Excitability changes that complement Hebbian learning. *Network, Computation in Neural Systems*, 2006, 17 (1). 31-41.

Karbowski et al., 'Multispikes and Synchronization in a Large Neural Network with Temporal Delays', Neural Computation 12, 1573-1606 (2000).

Khotanzad, Alireza, Classification of invariant image representations using a neural network, IEEF. Transactions on Acoustics, Speech, and Signal Processing vol. 38 No. 6 Jun. 1990 pp. 1028-1038.

Khotanzad, 'Classification of invariant image representations using a neural network' IEEF. Transactions on Acoustics, Speech, and Signal Processing, vol. 38, No. 6, Jun. 1990, pp. 1028-1038 [online], [retrieved on Dec. 10, 2013]. Retrieved from the Internet <URL: http://www-ee.uta.edu/eeweb/IP/Courses/SPR/Reference/Khotanzad.pdf>.

Knoblauch, et al. Memory Capacities for Synaptic and Structural Plasticity, *Neural Computation* 2009, pp. 1-45.

Laurent, 'Issue I—nnql—Refactor Nucleus into its own file—Neural Network Query Language' [retrieved on Nov. 12, 2013]. Retrieved from the Internet: URL:https:// code.google.com/p/nnql/issues/detail?id=1.

Laurent, 'The Neural Network Query Language (NNQL) Reference' [retrieved on Nov. 12, 2013]. Retrieved from the Internet: <URL'https://code.google.com/p/nnql/issues/detail?id=1>.

Lazar et al. 'A video time encoding machine', in Proceedings of the 15th IEEE International Conference on Image Processing (ICIP '08), 2008, pp. 717-720.

Lazar et al.,'Consistent recovery of sensory stimuli encoded with MIMO neural circuits.' Computational intelligence and neuroscience (2010): 2.

Lazar et al. 'Multichannel time encoding with integrate-and-fire neurons.' Neurocomputing 65 (2005): 401-407.

Masquelier and Thorpe, Learning to recognize objects using waves of spikes and Spike Timing-Dependent Plasticity. *Neural Networks* (IJCNN), The 2010 International Joint Conference on DOI —10.1109/IJCNN.2010.5596934 (2010) pp. 1-8.

Masquelier, Timothee. 'Relative spike time coding and STOP-based orientation selectivity in the early visual system in natural continuous and saccadic vision: a computational model.' Journal of computational neuroscience 32.3 (2012): 425-441.

Meister, M., Multineuronal codes in retinal signaling. *Proceedings of the National Academy of sciences*. 1996, 93, 609-614.

Meister, M.; Berry, M.J. The neural code of the retina, *Neuron*. 1999, 22, 435-450.

Nichols, A Re configurable Computing Architecture for Implementing Artificial Neural Networks on FPGA, Master's Thesis, The University of Guelph, 2003, pp. 1-235.

Oster M., Lichtsteiner P., Delbruck T, Liu S. A Spike-Based Saccadic Recognition System. *ISCAS 2007. IEEE International Symposium on Circuits and Systems*, 2009, pp. 3083-3086.

Paugam-Moisy et al. 'Computing with spiking neuron networks.' Handbook of Natural Computing, 40 p. Springer, Heidelberg (2009).

Paugam-Moisy et al., "Computing with spiking neuron networks" G. Rozenberg T. Back, J. Kok (Eds.), Handbook of Natural Computing, Springer-Verlag (2010) [retrieved Dec. 30, 2013], [retrieved online from link.springer.com].

Pavlidis et al. 'Spiking neural network training using evolutionary algorithms. In: Proceedings 2005 IEEE International Joint Conference on Neural Networkds, 2005. IJCNN'05, vol. 4, pp. 2190-2194 Publication Date Jul. 31, 2005 [online] [Retrieved on Dec. 10, 2013] Retrieved from the Internet <URL: http://citeseerx.ist.psu.edu/viewdoc/download?doi=10.1.1.5.4346&rep=rep1&type=pdf.

Rekeczky, et al., "Cellular Multiadaptive Analogic Architecture: A Computational Framework for UAV Applications." May 2004.

Revow M., Williams C., and Hinton, G.E., 1996, Using Generative Models for Handwritten Digit Recognition, *IEEE Trans. on Pattern Analysis and Machine Intelligence*, 18, No. 6, Jun. 1996.

Sanchez, Efficient Simulation Scheme for Spiking Neural Networks, *Doctoral Thesis, Universda di Granada* Mar. 28, 2008, pp. 1-104.

Sato et al., 'Pulse interval and width modulation for video transmission.' Cable Television, IEEE Transactions on 4 (1978): 165-173.

Schemmel, J., et al. Implementing synaptic plasticity in a VLSI spiking neural network model, Proceedings of the 2006 International Joint Conference on Neural Networks, Jul. 2006 pp. 1-6.

Schnitzer, We; Meister, M.; Multineuronal Firing Patterns in the Signal from Eye to Brain. *Neuron*, 2003, 37, 499-511.

Serrano-Gotarredona, et al, "On Real-Time: AER 2-D Convolutions Hardware for Neuromorphic Spike-based Cortical Processing", Jul. 2008.

SIMULINK.RTM. model [online], [Retrieved on Dec. 10, 2013] Retrieved from <:URL: http://www.mathworks.com/ products/simulink/index.html>.

Sinyavskiy et al. 'Reinforcement learning of a spiking neural network in the task of control of an agent in a virtual discrete environment' Rus. J. Nonlin. Dyn., 2011, vol. 7, No. 4 (Mobile Robots), pp. 859-875, chapters 1-8 (Russian Article with English Abstract).

Sjostrom et al., 'Spike-Timing Dependent Plasticity' Scholarpedia, 5(2):1362 (2010), pp. 1-18.

Szatmary et al., 'Spike-timing Theory of Working Memory' PLoS Computational Biology, vol. 6, Issue 8, Aug. 19, 2010 [retrieved on

(56) References Cited

OTHER PUBLICATIONS

Dec. 30, 2013]. Retrieved from the Internet: <URL: http://www.ploscompbiol.org/article/info%3Adoi%2F10.1371 %2Fjournal.pcbi.10008 79#>.
Thomas S. and Riesenhuber, M, 2004, Realistic Modeling of Simple and Complex Cell Tuning in the HMAX Model, and Implications for Invariant Object Recognition in Cortex, *AI Memo* 2004-017 Jul. 2004.
Thorpe, S.J., Delorme, A. & Vanrullen, R. (2001). Spike-based strategies for rapid processing. *Neural Networks* 14, pp. 715-725.
Thorpe, S.J., Guyonneau, R., Guilbaud, N., Allegraud, J-M. & Vanrullen, R. (2004). SpikeNet: real-time visual processing with one spike per neuron. *Neurocomputing*, 58-60, pp. 857-864.
Tim Gollisch and Markus Meister (2008) Rapid Neural Coding in the Retina with Relative Spike Latencies. *Science* 319:1 108-1111.
Van Rullen R.; Thorpe, S. Rate Coding versus temporal order coding: What the Retinal ganglion cells tell the visual cortex. *Neural computation*, 2001, 13, 1255-1283.
Vanrullen, R. & Koch, C. (2003). Is perception discrete or continuous? *Trends in Cognitive Sciences* 7(5), pp. 207-213.
Vanrullen, R., Guyonneau, R. & Thorpe, S.J. (2005). Spike times make sense. *Trends in Neurosciences* 28(1).
Wallis, G.; Rolls, E. T. A model of invariant object recognition in the visual system. *Progress in Neurobiology*. 1997, 51, 167-194.
Wang, 'The time dimension for scene analysis.' Neural Networks, IEEE Transactions on 16.6 (2005): 1401-1426.
Wiskott, L.; Sejnowski, T.J. Slow feature analysis: Unsupervised learning of invariances. *Neural Computation*, 2002, 14, (4), 715-770.
Zarandy, et al., "Bi-i: A Standalone Ultra High Speed Cellular Vision System", Jun. 2005.
Stringer, et al., "Invariant Object Recognition in the Visual System with Novel Views of 3D Objects", 2002. 2585-2596, 12 pages.
Wiskott, et al., "Slow Feature Analysis", 2002, 29 pages.
Ramachandran, et al., "The Perception of Phantom Limbs", The D.O. Hebb Lecture, Center for Brain and Cognition, University of California, 1998, 121, 1603-1630, 28 pages.
Brette, et al., "Simulation of Networks of Spiking Neurons: A Review of Tools and Strategies", Received Nov. 29, 2006, Revised Apr. 2, 2007, Accepted Apr. 12, 2007, Springer Science, 50 pages.
Izhikevich E.M., "Neural Excitability, Spiking and Bursting", Neurosciences Institute, Received Jun. 9, 1999, Revised Oct. 25, 1999, 1171-1266, 96 pages.
Kazantsev, et al., "Active Spike Transmission in the Neuron Model With a Winding Threshold Maniford", Jan. 3, 2012, 205-211, 7 pages.
Kling-Petersen, PhD, "Sun and HPC: From Systems to PetaScale" Sun Microsystems, no date, 31 pages.
Martinez-Perez, et al., "Automatic Activity Estimation Based on Object Behavior Signature", 2010, 10 pages.
Matsugu, et al., "Convolutional Spiking Neural Network for Robust Object Detection with Population Code Using Structured Pulse Packets", 2004, 39-55, 17 pages.
Chistiakova, Marina, and Maxim Volgushev. "Heterosynaptic plasticity in the neocortex." Experimental brain research 199.3-4 (2009): 377-390.
Knoblauch, Andreas, Gunther Palm, and Friedrich T. Sommer. "Memory capacities for synaptic and structural plasticity." Neural Computation 22.2 (2010): 289-341.
Meinhardt, Hans, and Alfred Gierer. "Pattern formation by local self-activation and lateral inhibition." Bioessays 22.8 (2000): 753-760.
Markram, Henry, et al. "Regulation of synaptic efficacy by coincidence of postsynaptic APs and EPSPs." Science 275.5297 (1997): 213-215.
Swiercz, Waldemar, et al. "A new synaptic plasticity rule for networks of spiking neurons." Neural Networks, IEEE Transactions on 17.1 (2006) 94-105.
Li, Zhaoping. "A saliency map in primary visual cortex." Trends in cognitive sciences 6.1 (2002): 9-16.
Itti, Laurent, and Christof Koch. "Computational modelling of visual attention." Nature reviews neuroscience 2.3 (2001): 194-203.
Izhikevich, Eugene M. Dynamical systems in neuroscience: chapters 1 and 2. MIT press. 2007.
Wu, QingXiang, et al. "Remembering Key Features of Visual Images based on Spike Timing Dependent Plasticity of Spiking Neurons." Image and Signal Processing, 2009. CISP '09. $2^{nd}$ International Congress on, IEEE. 2009.
Izhikevich, Eugene M. "Simple model of spiking neurons." IEEE Transactions on neural networks. 14.6 (2003): 1569-1572.
Fiete, et al. "Spike-time-dependent plasticity and heterosynaptic competition organize networks to produce long scale-free sequences of neural activity." Neuron 65.4 (2010): 563-576.

\* cited by examiner

ADAPTIVE PLASTICITY APPARATUS AND METHODS FOR SPIKING NEURON NETWORK

CROSS-REFERENCE TO RELATED APPLICATIONS

This application is related to co-owned U.S. patent application Ser. No. 13/152,119, entitled "SENSORY INPUT PROCESSING APPARATUS AND METHODS", filed on Jun. 2, 2011 and patented as U.S. Pat. No. 8,942,466 on Jan. 27, 2015, co-owned and co-pending U.S. patent application Ser. No. 13/465,924, entitled "SPIKING NEURAL NETWORK FEEDBACK APPARATUS AND METHODS", filed May 7, 2012, co-owned and co-pending U.S. patent application Ser. No. 13/465,903 entitled "SENSORY INPUT PROCESSING APPARATUS IN A SPIKING NEURAL NETWORK", filed May 7, 2012, a co-owned and co-pending U.S. patent application Ser. No. 13/465,918, entitled "SPIKING NEURAL NETWORK OBJECT RECOGNITION APPARATUS AND METHODS", filed May 7, 2012, co-owned U.S. patent application Ser. No. 13/488,106, entitled "SPIKING NEURON NETWORK APPARATUS AND METHODS", filed Jun. 4, 2012, co-owned and co-pending U.S. patent application Ser. No. 13/488,144, entitled "SPIKING NEURON NETWORK APPARATUS AND METHODS", filed Jun. 4, 2012, co-owned, co-pending U.S. patent application Ser. No. 13/541,531, entitled "CONDITIONAL PLASTICITY SPIKING NEURON NETWORK APPARATUS AND METHODS", filed Jul. 3, 2012, co-owned, co-pending U.S. patent application Ser. No. 13/660,945, entitled "MODULATED PLASTICITY APPARATUS AND METHODS FOR SPIKING NEURON NETWORKS", filed on Oct. 25, 2012, co-owned U.S. patent application Ser. No. 13/660,967, entitled "APPARATUS AND METHODS FOR ACTIVITY-BASED PLASTICITY IN A SPIKING NEURON NETWORK", filed on Oct. 25, 2012 and patented as U.S patent No. 8,972,315 on Mar. 3, 2015, and co-owned, co-pending U.S. patent application Ser. No. 13/660,982, entitled "SPIKING NEURON SENSORY PROCESSING APPARATUS AND METHODS FOR SALIENCY DETECTION", filed on Oct. 25, 2012, each of the foregoing incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technological Field

The present disclosure relates generally to artificial neural networks, and more particularly in one exemplary aspect to computer apparatus and methods for plasticity implementation in a pulse-code neural network.

2. Description of Related Art

Artificial spiking neural networks are frequently used to gain an understanding of biological neural networks, and for solving artificial intelligence problems. These networks typically employ a pulse-coded mechanism, which encodes information using timing of the pulses. Such pulses (also referred to as "spikes" or 'impulses') are short-lasting (typically on the order of 1-2 ms) discrete temporal events. Several exemplary embodiments of such encoding are described in commonly owned and co-pending U.S. patent application Ser. No. 13/152,084 entitled "APPARATUS AND METHODS FOR PULSE-CODE INVARIANT OBJECT RECOGNITION", filed Jun. 2, 2011, and co-owned U.S. patent application Ser. No. 13/152,119,filed Jun. 2, 2011, entitled "SENSORY INPUT PROCESSING APPARATUS AND METHODS", and patented as U.S. Pat. No. 8,942,466 on Jan. 27, 2015, each incorporated herein by reference in its entirety.

Typically, artificial spiking neural networks, such as the exemplary network described in owned U.S. patent application Ser. No. 13/541,531, entitled "CONDITIONAL PLASTICITY SPIKING NEURON NETWORK APPARATUS AND METHODS", may comprise a plurality of units (or nodes), which correspond to neurons in a biological neural network. Any given unit may be connected to many other units via connections, also referred to as communications channels, and/or synaptic connections. The units providing inputs to any given unit are commonly referred to as the pre-synaptic units, while the unit receiving the inputs is referred to as the post-synaptic unit.

Each of the unit-to-unit connections may be assigned, inter alia, a connection efficacy, which in general may refer to a magnitude and/or probability of input spike influence on unit output response (i.e., output spike generation/firing). The efficacy may comprise, for example a parameter—synaptic weight—by which one or more state variables of post-synaptic unit are changed. During operation of a pulse-code network, synaptic weights may be dynamically adjusted using what is referred to as the spike-timing dependent plasticity (STDP) in order to implement, among other things, network learning. In some implementations, larger weights may be associated with a greater effect a synapse has on the activity of the post-synaptic neuron.

In some existing plasticity implementations, connections that deliver inputs (to a given unit) prior to generation of post-synaptic response may be potentiated, while connections that deliver inputs after the generation of the post-synaptic response may be depressed. The choice of plasticity functional dependence may determine network behavior. Accordingly, various implementations plasticity mechanisms exist including, for example, the use of target connection efficiency (that may be defined as a ratio of a number of input (pre-synaptic) spikes $N_{fire}$ delivered to a neuron via the connection that are followed by neuron response (e.g., post-synaptic spike) generation, to the total number of input spikes $N_{tot}$ delivered to the neuron via the connection. However, existing plasticity implementations do not always provide for network behavior, particularly when input characteristics change.

Consequently there is a salient need for improved adaptive plasticity mechanisms to enable a spiking neuron network capable of operating in a wide variety of input and network dynamic regimes.

SUMMARY OF THE DISCLOSURE

The present disclosure satisfies the foregoing needs by providing, inter alia, apparatus and methods for implementing adaptive plasticity in spiking neuron networks that may be dynamically adjusted in accordance with the connection activity thereby enhancing the learning performance of a neural network.

In a first aspect of the disclosure, a method of updating an efficacy of a connection configured to communicate an input to an artificial spiking neuron is disclosed. In one embodiment, the method includes: determining a similarity measure between the input and a neuron output; identifying one or more components associated with one or more lag values, respectively, from the similarity measure; and updating the efficacy based on the one or more components.

In a second aspect, computerized spiking neuron apparatus is disclosed. In one embodiment, the apparatus comprise a storage medium, the storage medium comprising a plurality of executable instructions configured to, when executed, adjust an efficacy of an interface of the neuron by at least: adjustment of neuron excitability based on one or more pre-synaptic inputs; storage of one or more pre-synaptic times associated with one or more pre-synaptic inputs; and when the excitability is above a threshold: generation of post-synaptic output; determination of a similarity measure between the neuron output signal, comprising the response, and the one or more pre-synaptic inputs; determination of a long term potentiation component (LTP) of the adaptive plasticity based on the similarity measure; and determination of a long term depression component of the adaptive plasticity based on a parameter associated with the LTP In one variant, the response is generated by the neuron based on the one or more pre-synaptic inputs.

In another aspect, a computerized spiking neuron network system is disclosed. In one embodiment, the system is configured to implement an adaptive plasticity in the network, and includes: one or more processors configured to execute computer program modules, the execution of the computer program modules configured to cause the one or more processors, based on a response by a neuron of the network, to adjust one or more connections capable of providing input to the neuron by at least: determination of one or more similarity measures between the neuron output signal, comprising the response, and one or more input signals provided by the one or more connections, respectively; determination of a long term potentiation component (LTP) of the adaptive plasticity based on an average of the one or more similarity measures; and determination of a long term depression component of the adaptive plasticity based on a parameter associated with the LTP.

In another aspect, computer readable apparatus is disclosed. In one embodiment, the apparatus includes at least one computer program configured to, when executed, implement an adaptive plasticity in a neural network.

Further features of the present disclosure, its nature and various advantages will be more apparent from the accompanying drawings and the following detailed description.

Figure 1:
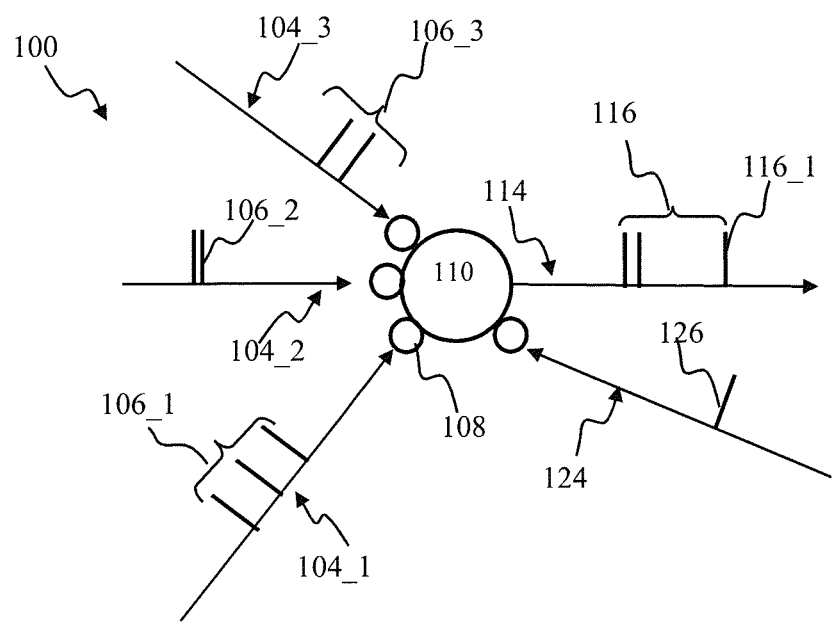
FIG. 1 is a block diagram depicting an artificial spiking neural network according to one implementation.

All Figures disclosed herein are © Copyright 2012 Brain Corporation. All rights reserved.

DETAILED DESCRIPTION

Embodiments and implementations of the various aspects of the present innovation will now be described in detail with reference to the drawings, which are provided as illustrative examples so as to enable those skilled in the art to practice the disclosure. Notably, the figures and examples below are not meant to limit the scope of the present disclosure to a single embodiment or implementation, but other embodiments and implementations are possible by way of interchange of or combination with some or all of the described or illustrated elements. Wherever convenient, the same reference numbers will be used throughout the drawings to refer to same or like parts.

Where certain elements of these embodiments or implementations can be partially or fully implemented using known components, only those portions of such known components that are necessary for an understanding of the present disclosure will be described, and detailed descriptions of other portions of such known components will be omitted so as not to obscure the innovation.

In the present specification, an embodiment or implementations showing a singular component should not be considered limiting; rather, the invention is intended to encompass other embodiments or implementations including a plurality of the same component, and vice-versa, unless explicitly stated otherwise herein.

Further, the present invention encompasses present and future known equivalents to the components referred to herein by way of illustration.

As used herein, the term "bus" is meant generally to denote all types of interconnection or communication architecture that is used to access the synaptic and neuron memory. The "bus" could be optical, wireless, infrared or another type of communication medium. The exact topology of the bus could be for example standard "bus", hierarchical bus, network-on-chip, address-event-representation (AER) connection, or other type of communication topology used for accessing, e.g., different memories in pulse-based system.

As used herein, the terms "computer", "computing device", and "computerized device", include, but are not limited to, personal computers (PCs) and minicomputers, whether desktop, laptop, or otherwise, mainframe computers, workstations, servers, personal digital assistants (PDAs), handheld computers, embedded computers, programmable logic device, personal communicators, tablet computers, portable navigation aids, J2ME equipped devices, cellular telephones, smart phones, personal integrated communication or entertainment devices, or literally any other device capable of executing a set of instructions and processing an incoming data signal.

As used herein, the term "computer program" or "software" is meant to include any sequence or human or machine cognizable steps which perform a function. Such program may be rendered in virtually any programming language or environment including, for example, C/C++, C#, Fortran, COBOL, MATLAB™, PASCAL, Python, assembly language, markup languages (e.g., HTML, SGML, XML, VoXML), and the like, as well as object-oriented environments such as the Common Object Request Broker Architecture (CORBA), Java™ (including J2ME, Java Beans, etc.), Binary Runtime Environment (e.g., BREW), and the like.

As used herein, the terms "connection", "link", "synaptic channel", "transmission channel", "delay line", are meant generally to denote a causal link between any two or more entities (whether physical or logical/virtual), which enables information exchange between the entities.

As used herein, the term "memory" includes any type of integrated circuit or other storage device adapted for storing digital data including, without limitation, ROM. PROM, EEPROM, DRAM, Mobile DRAM, SDRAM, DDR/2 SDRAM, EDO/FPMS, RLDRAM, SRAM, "flash" memory (e.g., NAND/NOR), memristor memory, and PSRAM.

As used herein, the terms "processor", "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., field programmable gate arrays (FPGAs)), PLDs, reconfigurable computer fabrics (RCFs), array processors, secure microprocessors, and application-specific integrated circuits (ASICs). Such digital processors may be contained on a single unitary IC die, or distributed across multiple components.

As used herein, the term "network interface" refers to any signal, data, or software interface with a component, network or process including, without limitation, those of the FireWire (e.g., FW400, FW800, etc.), USB (e.g., USB2), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), Wi-Fi (802.11), WiMAX (802.16), PAN (e.g., 802.15), cellular (e.g., 3G, LTE/LTE-A/TD-LTE, GSM, etc.) or IrDA families.

As used herein, the terms "pulse", "spike", "burst of spikes", and "pulse train" are meant generally to refer to, without limitation, any type of a pulsed signal, e.g., a rapid change in some characteristic of a signal, e.g., amplitude, intensity, phase or frequency, from a baseline value to a higher or lower value, followed by a rapid return to the baseline value and may refer to any of a single spike, a burst of spikes, an electronic pulse, a pulse in voltage, a pulse in electrical current, a software representation of a pulse and/or burst of pulses, a software message representing a discrete pulsed event, and any other pulse or pulse type associated with a discrete information transmission system or mechanism.

As used herein, the term "receptive field" is used to describe sets of weighted inputs from filtered input elements, where the weights may be adjusted.

As used herein, the term "Wi-Fi" refers to, without limitation, any of the variants of IEEE-Std. 802.11 or related standards including 802.11 a/b/g/n/s/v and 802.11-2012.

As used herein, the term "wireless" means any wireless signal, data, communication, or other interface including without limitation Wi-Fi, Bluetooth, 3G (3GPP/3GPP2), HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, LTE/LTE-A/TD-LTE, analog cellular, CDPD, RFID or NFC (e.g., EPC Global Gen. 2, ISO 14443, ISO 18000-3), satellite systems, millimeter wave or microwave systems, acoustic, and infrared (e.g., IrDA).

Overview

The present disclosure provides, in one salient aspect, apparatus and methods for implementing adaptive plasticity mechanisms configured to, inter alia, to improve learning (faster learning or learn more useful features) in artificial spiking neuron networks, without requiring pre-defined and/or hard coded plasticity rules.

In one or more implementations, the adaptive plasticity mechanism may be based on a similarity measure (e.g., a cross-correlogram, cross-correlation, convolution, deconvolution, and/or mutual information) between neuron output and neuron input. When the neuron generates an output (fires a spike), the cross-correlogram may be determined based on (i) a time record of pre-synaptic input into the neuron with a time interval $\Delta T$ prior to the output; and (ii) a time record of post-synaptic output by the neuron with the same time interval. In some implementations of neurons comprising multiple pre-synaptic connections (physical and/or logical), individual correlograms may be constructed for individual connections. An averaged (over multiple connections) correlogram may be determined. In some implementations, multiple correlogram estimates (associates with multiple post-synaptic responses) may be averaged to produce a time-averaged similarity measure. The averaging may be implemented in only time with individual synapses having their respective correlogram. In some implementations, the averaging may be implemented over both time and synapses so that a single correlogram may be shared by all input synapses.

In some implementations, individual spikes may be assigned the same amplitude (e.g., binary 1). Accordingly, the binary correlogram may be interpreted as a histogram of pre-synaptic spike occurrence within individual time slots (bins) prior to the post-synaptic response.

Averaged similarity measure may be used to construct plasticity rules for the connections of the neuron. The STDP rule may comprise for instance a long term depression (LTD) rule and/or a long term potentiation (LTP) rule.

The causal portion (i.e., the portion of the similarity measure for which the pre-synaptic spikes occur before the post spikes) of the similarity measure may be used, inter alia, to construct the LTP rule. Magnitude of plasticity adjustments may be scaled such that the mean of the similarity measure is a constant. In some implementations, magnitude of plasticity adjustments may be scaled such that the maximum value of the similarity measure is a constant.

In some implementations, The LTD portion of the STDP rule may comprise a monotonic function (e.g., a constant, gradually increasing and/or decreasing). Magnitude of the LTD portion may be determined based on a statistical parameter of the LTP portion. In some implementations, the statistical parameter may comprise maximum, mean, and/or median of the correlogram).

The adaptively configured STDP rules may be used to adjust weights of neuron input connections. In some implementations, the adjustment may be performed based on the post-synaptic response by the neuron.

The plasticity methodology describe herein may advantageously improve learning of the neural network. The improved learning may be characterized by a faster convergence, convergence to more meaningful features, fewer recognition errors, requiring fewer neurons to represent a given input. In some implementations, the activity bases plasticity mechanism may enable learning of temporally stable patterns (e.g., learning a component of the temporal feature without drift).

In another aspect of the disclosure, adaptive adjustment methodologies are used to implement processing of visual sensory information and feature/object recognition using spiking neuronal networks. Portions of the object recognition apparatus can be embodied for example in a remote computerized apparatus (e.g., server), comprising a computer readable apparatus.

Embodiments of the foregoing plasticity mechanism of the present disclosure are useful in a variety of applications including for instance a prosthetic device, autonomous robotic apparatus, and other electromechanical devices requiring visual or other sensory data processing functionality.

Methods

Detailed descriptions of the various embodiments and implementations of the apparatus and methods of the disclosure are now provided. Although certain aspects of the disclosure can best be understood in the context of the visual and sensory information processing using spiking neural networks, the disclosure is not so limited, and implementations of the disclosure may also be used in a wide variety of other applications, including for instance in implementing connection adaptation in pulse-code neural networks.

Implementations of the disclosure may be for example deployed in a hardware and/or software realization of a neuromorphic computer system. In one such implementation, a robotic system may include a processor embodied in an application specific integrated circuit, which can be adapted or configured for use in an embedded application (such as a prosthetic device).

FIG. 1 illustrates one exemplary implementation of a spiking neuronal network of the disclosure, configured to process sensory information using adaptive plasticity mechanism. The network 100 may comprise one or more spiking neurons, e.g., the neuron 110 in FIG. 1), The neuron 110 may be configured to receive feed-forward spiking input via connections 104. In some implementations, the neuron 110 may be configured to receive feedback spiking input via the connections 124. The neuron 110 may generate output (e.g., a post-synaptic spike) using any of applicable methodologies such as for example those described in co-owned and co-pending U.S. patent application Ser. No. 13/152,105 filed on Jun. 2, 2011, and entitled "APPARATUS AND METHODS FOR TEMPORALLY PROXIMATE OBJECT RECOGNITION", incorporated by reference herein in its entirety. The output spikes of the neuron 110 may be propagated via the connection 114. Post-synaptic spike generation is well-established in the spiking network arts, and accordingly will not be described in detail herein for brevity and clarity of presentation of the inventive aspects of the present disclosure.

The connections 104_1, 104_2, 104_3, 124 may be characterized by connection efficacy. Efficacy may refer to a magnitude and/or probability of input spike influence on neuronal response (i.e., output spike generation or firing). Efficacy may comprise, for example a parameter 108 (e.g., synaptic weight, delay, probability of transmission, and/or other parameter) by which one or more state variables of the neuron 110 may be changed.

Connection efficacy may be changed in accordance with one or more STDP rules. In some implementations, individual connections may utilize connection-specific rules. In one or more implementations, different classes of connections (e.g., fee-forward, lateral, and/or feedback) may utilize type-specific common STDP rules.

In some implementations, the STDP rule may comprise an adaptive STDP mechanism that may be determined in real time by a network entity (e.g., the neuron 110, and/or another entity (connection).

In one or more implementations, the adaptive plasticity mechanism may be based on a similarity measure (e.g., a cross-correlogram and/or mutual information) between neuron output (e.g., the output 116) and the neuron input (e.g., the input 106_1, 106_2, 1063, 126 in FIG. 1).

Figure 2:
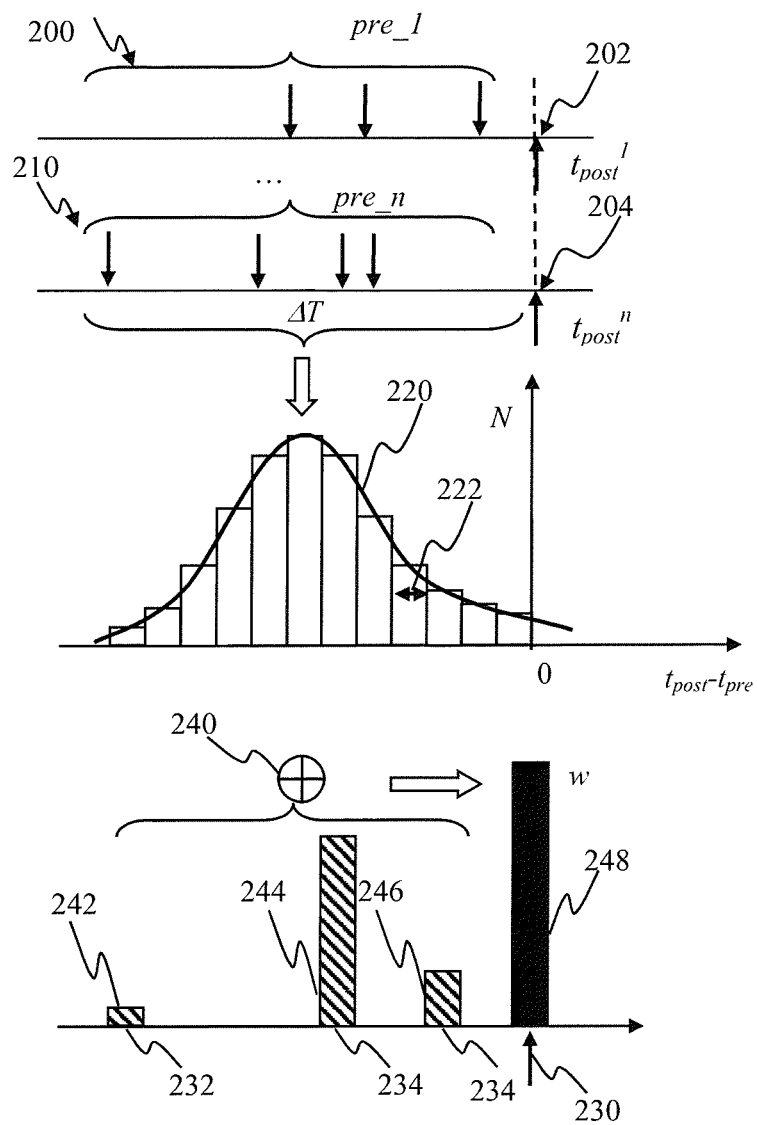
FIG. 2 is a graphical illustration depicting histogram determination based on post-synaptic and pre-synaptic activity of a unit of the spiking network of FIG. 1, according to one implementation.

FIG. 2 illustrates one implementation of such an adaptive mechanism. When the neuron generates an output (fires a spike 116_1, and/or spike 202 in FIG. 2) at time $t_{post}$, the cross-correlogram may be determined based on (i) a time record of pre-synaptic input (e.g., the input 106_1, 106_2, 106_3, 126 in FIG. 1, and/or input 200, 210 in FIG. 2) into the neuron with a time interval $t_{post}-\Delta T$; and (ii) a time record of post-synaptic output (e.g., the output 116 in FIG. 1) by the neuron with the same time interval. The time interval $\Delta T$ may be selected form the range between 1 and 100 ms, preferably 40 ins. In some implementations, multiple correlogram estimates (associates with multiple post-synaptic responses 202, 204) may be averaged to produce a time-averaged similarity measure 220. In some implementations, the average histogram 220 maybe computed by averaging over the last 1000 spikes across all input synapses, or may be computed by averaging over the last 100 second time period.

In some implementations where the neuron receives multiple pre-synaptic connections (physical and/or logical, as illustrated in FIG. 1), individual correlograms may be constructed for individual connections (e.g., the connections 104 in FIG. 1). An averaged (over multiple connections) correlogram may be determined (not shown in FIG. 2).

In some implementations, individual spikes (e.g., the spike groups 200, 210 in FIG. 2) may be assigned the same amplitude (e.g., binary 1). Accordingly, the binary correlogram 220 may be interpreted as a histogram of pre-synaptic spike occurrence within individual time slots (bins) prior to the post-synaptic response. In some implementations, the time step (bin width) 222 may be selected equal to 1 ms.

Figure 3:
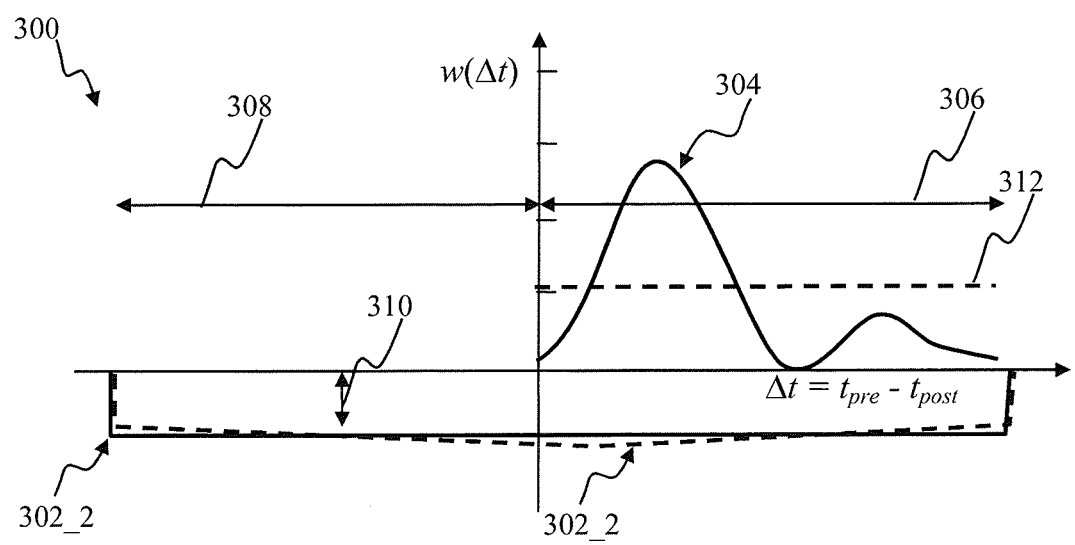
FIG. 3 is a plot depicting adaptively constructed spike-time dependent plasticity (STDP) for use in the spiking network of FIG. 1, according to one implementation.

An averaged similarity measure (e.g., the correlogram 220) may be used to construct plasticity rules for the connections of the neuron, as described in detail with respect to the exemplary implementation of FIG. 3.

The STDP rule 300 of FIG. 3 may comprise a long term depression rule 302 and/or a long term potentiation rule 304. For example, the pre-synaptic portion (i.e., where $t_{pre}<t_{post}$) may comprise the LTD rule, and the post-synaptic portion (i.e., where $t_{pre} \geq t_{post}$) may comprise the LTP rule, as shown in FIG. 3.

The causal portion of the similarity measure (e.g., the portion of the curve 220 of FIG. 2 where $t_{post}-t_{pre}<0$, also corresponding to the portion of the correlogram where pre-synaptic spikes came before post-synaptic spikes) may be used to construct the LTP rule. In some implementations, the LTP rule may be characterized by a plasticity window Tp 306 in FIG. 3. Correspondingly, values of the similarity measure (220 in FIG. 2) that fall within the time interval 306 may be used to determine the LTP portion of the plasticity rule. In some implementations, the similarity measure and w(Δt) of plasticity adjustments may be scaled such that the mean value is constrained to be 1, or the maximum value may be constrained to be 1. The LTD portion of the STDP rule may comprise for example a monotonic function of time (e.g., a constant 302_1, gradually increasing and/or decreasing 302_2). The magnitude of the LTD portion may be determined based on a statistical parameter of the LTP portion. The statistical parameter may comprise for instance mean, median, a percentile, maximum, etc.

The LTD portion may be characterized by a time window Td 308. In some implementations, the LTP and LTD windows 306, 308 may be configured equal to one another. In one or more implementations, the time window ΔT used for determining similarity measure (e.g., the measure 220 in FIG. 2) may be set equal to either Tp, Td. The time windows ΔT, Tp, Td may also be configured different from one another, such that the window of LTD is longer than LTP (or vice versa), depending on the temporal structure of the pattern to be learned.

The adaptively configured STDP rules (e.g., the rules 304, 302 in FIG. 3) may be used to adjust efficacy of neuron connections. In some implementations, the adjustment may be performed based on the post-synaptic response of the neuron. In one or more implementations, the efficacy may comprise synaptic weight.

Returning now to FIG. 2, when the neuron generates post-synaptic response (230 in FIG. 2), the history of pre-synaptic input may be evaluated. One or more pre-synaptic pulses (the spikes 232, 234, 236 in FIG. 2) may be identified within the time window ΔT, prior to the post-synaptic spike 230. Plasticity components (e.g., the components 242, 244, 246), corresponding to the pre-synaptic times $t_{pre}^i$ of the identified pulses 232, 234, 236, may be combined by an operator 240 to produce weight adjustment w 248. In some implementations, the adjustment may be performed based on an event, such as timer expiration, buffer overflow, external (reward) indication, and/or other event types).

Figure 4:
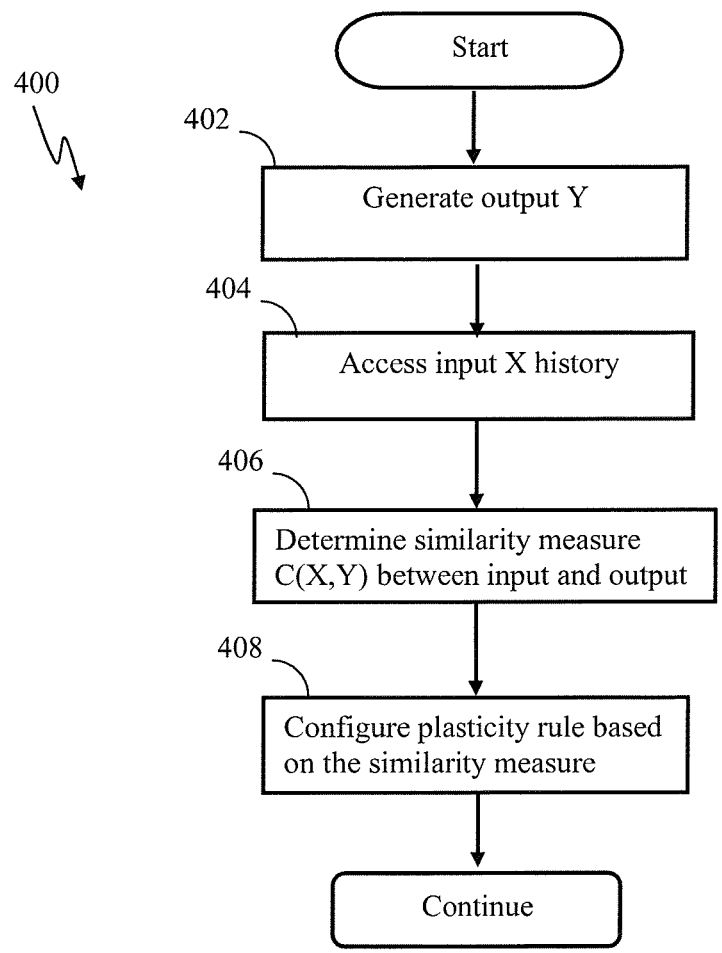
FIG. 4 is a logical flow diagram illustrating determination of an adaptive plasticity mechanism, in accordance with one implementation.
Figure 5:
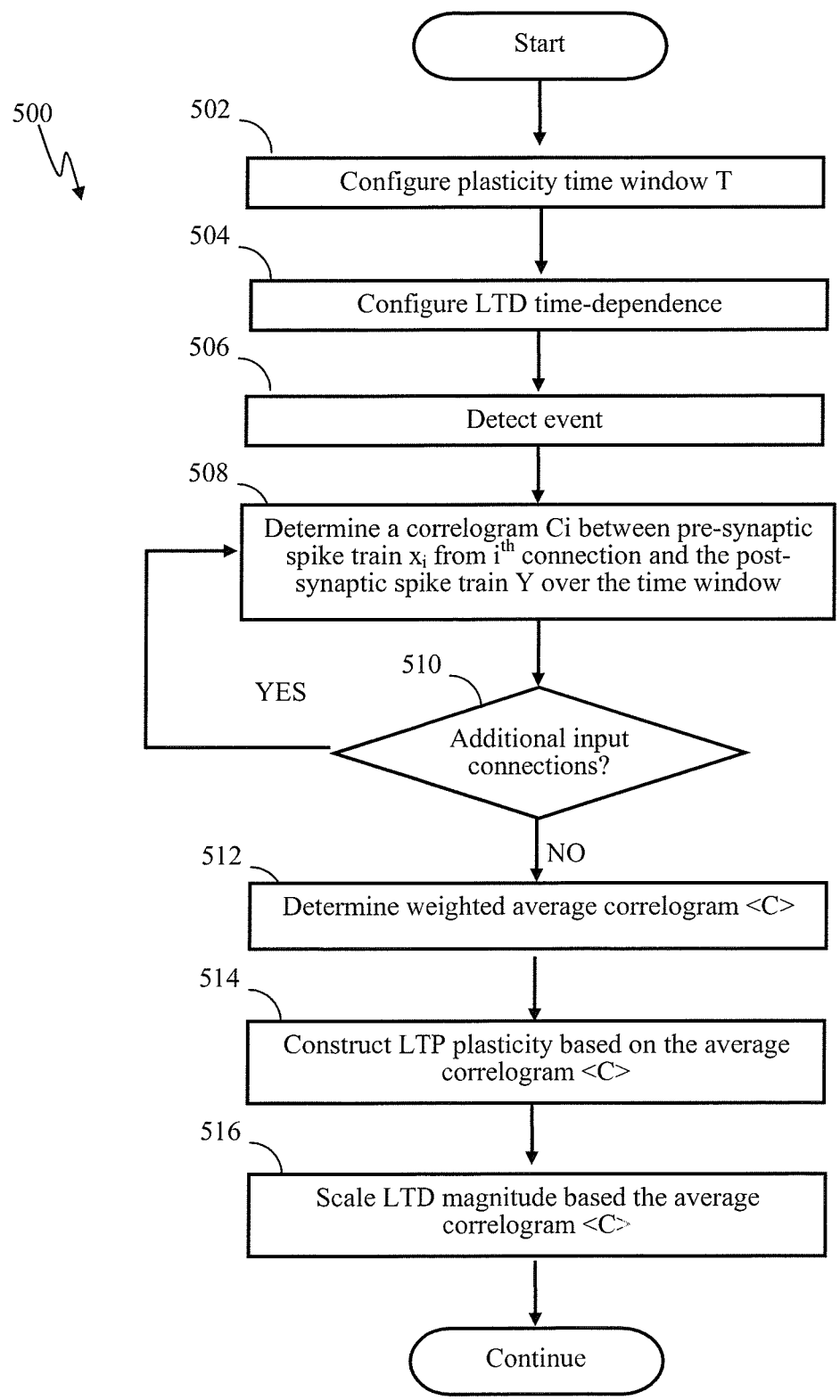
FIG. 5 is a logical flow diagram illustrating a method of determining adaptive plasticity for a spiking neuron comprising multiple input connections, in accordance with one implementation.
Figure 6:
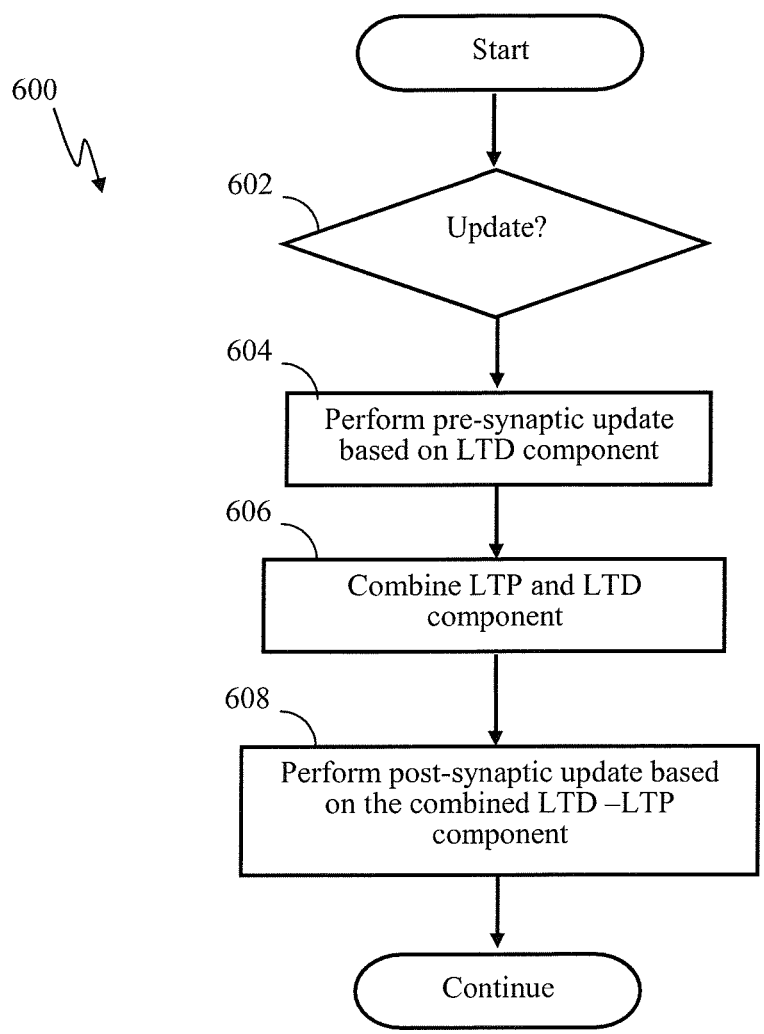
FIG. 6 is a logical flow diagram illustrating a method of connection plasticity update based on the adaptive STDP rule, in accordance with one implementation.

Referring now to FIGS. 4-6, exemplary implementations of adaptive plasticity methods according to the disclosure are described. In some implementations, the methods of FIGS. 4-6 may be used, for example, for operating the neurons 102 of FIG. 1. Moreover, methods of FIG. 4-6 may be implemented in a connection (e.g., the connection 104, 124 of FIG. 1). The methods of FIG. 4-6 may also be implemented in sensory processing apparatus, comprising one or more spiking neuron networks as described with respect to FIG. 8, infra, thereby advantageously aiding, inter alia improving the speed and or quality of learning, potentially requiring fewer neurons to represent a given input, as well as learning temporally stable patterns.

FIG. 4 illustrates a method of determining adaptive plasticity for a spiking neuron based on a similarity measure between neuron input and output, in accordance with one implementation.

At step 402 of method 400, a neuron generates an output Y. In some implementations, the output may be generated in accordance with a deterministic spike response model, as described for example in co-owned U.S. patent application Ser. No. 13/152,119, entitled "APPARATUS AND METHODS FOR TEMPORALLY PROXIMATE OBJECT RECOGNITION", filed on Jun. 2, 2011, and patented as U.S. Pat. No. 8,942,466 on Jan. 27, 2015, incorporated herein by reference in its entirety. In some implementations, the spike response process may comprise adaptive threshold adjustment as described in co-owned U.S. patent application Ser. No. 13/623,820, entitled "APPARATUS AND METHODS FOR ENCODING OF SENSORY DATA USING ARTIFICIAL SPIKING NEURONS", filed on Sep. 20, 2012, incorporated herein by reference in its entirety. In some implementations, the neuron may be operable in accordance with stochastic process, as described in co-owned U.S. patent application Ser. No. 13/487,499, entitled "STOCHASTIC APPARATUS AND METHODS FOR IMPLEMENTING GENERALIZED LEARNING RULES", filed on Jun. 4, 2012, incorporated herein by reference in its entirety.

At step 404 of the method 400, a history of inputs into the neuron may be accessed. In some implementations, the history may comprise one or more spikes 106_1, 106_1, 106_1 in FIG. 1. The history may comprise for example time data of pre-synaptic spikes stored in a synaptic memory buffer as described in U.S. patent application Ser. No. 13/239,259, entitled "APPARATUS AND METHOD FOR PARTIAL EVALUATION OF SYNAPTIC UPDATES BASED ON SYSTEM EVENTS", filed on Sep. 21, 2011, and patented as U.S. Pat. No. 8,725,662 on May 13, 2014, incorporated supra.

At step 406, a similarity measure C(X,Y,t) between the output (X) and the input (Y) as a function of time shift (t) may be determined. In some implementations, the similarity measure may use correlation measured at different time shifts; i.e., a correlogram, as described with respect to FIG. 2, supra. The similarity measure may use for example mutual information at different time shifts as determined as follows:

$$I(X;Y) = \sum_{y \in Y} \sum_{x \in X} p(x, y) \log\left(\frac{p(x, y)}{p(x)p(y)}\right),$$

where:

p(x,y) is the joint probability distribution function of X and Y; and p(x) and p(y) are the marginal probability distribution functions of X and Y respectively.

At step 408, a plasticity rule is configured based on the similarity measure. In some implementations, the plasticity rule determination may comprise approach described with respect to FIGS. 2A-3, supra.

FIG. 5 illustrates a method of determining adaptive plasticity for a spiking neuron comprising multiple input connections, in accordance with one implementation.

At step 502 of the method 500, plasticity time window is configured. In some implementations, the LTP and LTD component may comprise the time extent T. In one or more implementations, the LTP and LTD component may comprise different time extents Tp, Td.

At step 504, LTD time-dependence is configured. In one or more implementations, the LTD may comprise a constant, a gradually increasing and/or decreasing function (e.g., the functions 302_1, 302_2 illustrated in FIG. 3).

At step 506, an event is detected. In some implementations, the event may comprise post-synaptic spike generation by the neuron. The event may comprise for example an external event (e.g., reinforcement signal), a timer event (e.g., for cyclic updates), a buffer overflow event (e.g., indicative of a memory buffer, storing, for example, pre-synaptic and/or post-synaptic spike history being full or nearly full), etc.

Responsive to the event, at step 508, a correlogram $C_i$ (e.g., between pre-synaptic spike train $x_i$ from $i^{th}$ connection and the post-synaptic spike train Y over the time window T) is determined. In one implementation, the correlogram determination comprises:

partitioning the time window into M bins;
identifying number $n_m$ of pre-synaptic inputs xi associated with individual $m^{th}$ bin, m=1–M; and
incrementing value of $m^{th}$ bin by $n_m$.

It will be appreciated by those skilled in the arts that other similarity measures may be employed at step 508 in place and/or along with the correlogram, such as, for example, cross-correlation, mutual information, and/or convolution.

At step 510, a check may be performed if inputs form other connections need to be processed. When data from additional connections exist, the method 500 may return to step 508.

When no additional data are present, the method 500 may proceed to step 512, where average correlogram may be determined as a weighted average:

$$<C>=\rho_{i=1}^{N}(a_i C_i) \quad \text{(Eqn. 1)}$$

where $a_i$ comprise the weights. The individual weights may be set to the same value. In some implementations, the weights may be set synapse-specific. For example, the weights could be "0" for very weak synaptic connections, and "1" for strong connections.

At step 514, the LTP portion of the STDP rule (e.g., the rule 304 in FIG. 3) is determined using the causal (tpre<tpost) portion of the average correlogram <C> of Eqn. 1.

At step 516, the magnitude of the LTD portion of the STDP rule (e.g., the magnitude 310 of the rule 302_1 in FIG. 3) is determined. In some implementations, the magnitude may be based on a statistical parameter (e.g., mean, median, percentile, maximum, etc. of the LTP rule portion).

FIG. 6 illustrates a method of connection plasticity update based on the adaptive STDP rule, in accordance with one implementation.

At step 602, a determination may be made whether the update is to be performed. In one or more implementations, the update may be based on a post-synaptic spike by the neuron. The update may be based for example on an external event (e.g., reinforcement signal), a timer event (e.g., for cyclic updates), a buffer overflow event (e.g., indicative of a memory buffer, storing, for example, pre-synaptic and/or post-synaptic spike history being full or nearly full), etc.

When the update is to be performed, the method proceeds to step 604, where pre-synaptic update may be performed. In some implementations, the pre-synaptic update may comprise the LTD rule (e.g., the rule determined at step 516 of FIG. 5 and/or rule 302 of FIG. 3).

At step 606, the LTP and the LTD rules (e.g., the rules 304, 302 of FIG. 3) may or may not be combined to produce the post-rule. For example, in some implementations, the post-rule may be exclusively LTP-based, or may be a combination of both LTP and LTD. The combination may be used in order increase the selectivity of which temporal patterns are potentiated.

At step 608, the post-synaptic update is performed. In some implementations, the post-synaptic update may comprise the combined rule.

Performance

Figure 7:
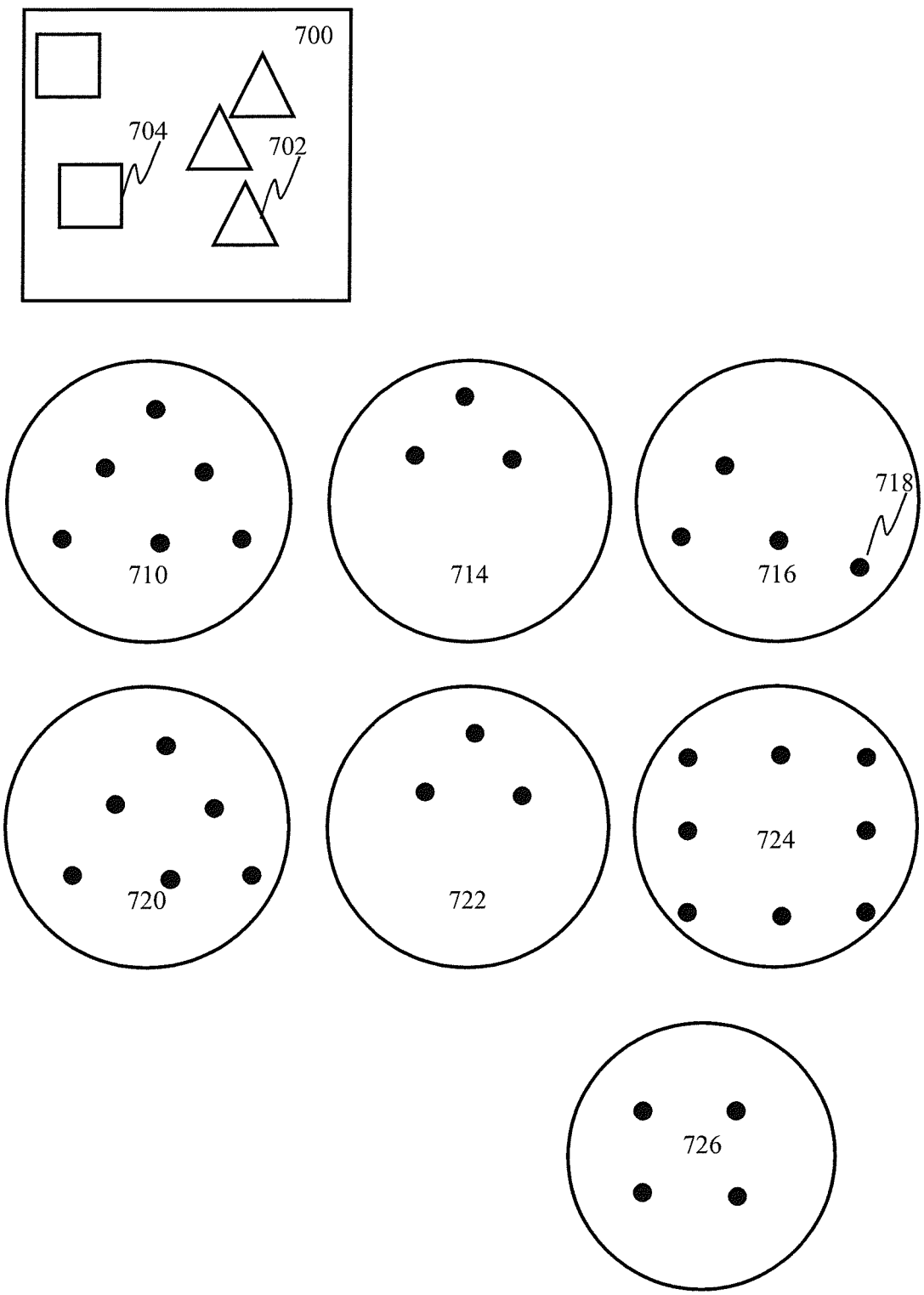
FIG. 7 is a block diagram illustrating performance of a sensory processing apparatus comprising adaptive plasticity mechanism in accordance with one implementation.

FIG. 7 illustrates exemplary performance data associated with a learning object recognition apparatus comprising an adaptive plasticity mechanism. A signal processing apparatus (e.g., the apparatus 1000 of FIG. 8 described in detail below) may receive one or more input frames, such as the frame 700 of FIG. 7. The input frames may comprise representations of one or more objects, such as the triangles 702 and the squares 704 of frame 700.

The circular panels in FIG. 7 depict receptive fields of the post-synaptic neurons of the network that may develop during learning by the network based on the input (e.g., one or more frames 700). The solid dots 718 in FIG. denote responses of the one or more post-synaptic neurons.

The receptive fields 710, 714, 716 depict performance of a network comprising plasticity mechanism of the prior art. As shown by the receptive fields 710, 714, 716, the network is capable of learning only a single feature (e.g., the triangle 702). Furthermore, the prior art plasticity mechanism may cause one or more post-synaptic neurons to generate erroneous responses, as illustrated by the solid circle 718 in FIG. 7.

Contrast the network responses 710, 714, 716 with the receptive 720, 722, 724, 726 corresponding to the network comprising an exemplary adaptive plasticity mechanism of the present disclosure. The receptive fields 720, 722, 724, 726 illustrate that the network (e.g., comprising one or more neurons 110 of FIG. 1) is capable of learning both the triangular objects (as shown by the neuron responses in the panels 720, 722) as well as the square objects (as shown by the neuron responses in the panels 724, 726). In addition, the performance of the network comprising the exemplary inventive adaptive plasticity mechanism is characterized by a lower number of erroneous responses.

Exemplary Apparatus

Various exemplary spiking network apparatus implementing one or more of the methods set forth herein (e.g., using the exemplary adaptive mechanisms described above) are now described with respect to FIGS. 7-11.

Figure 8:
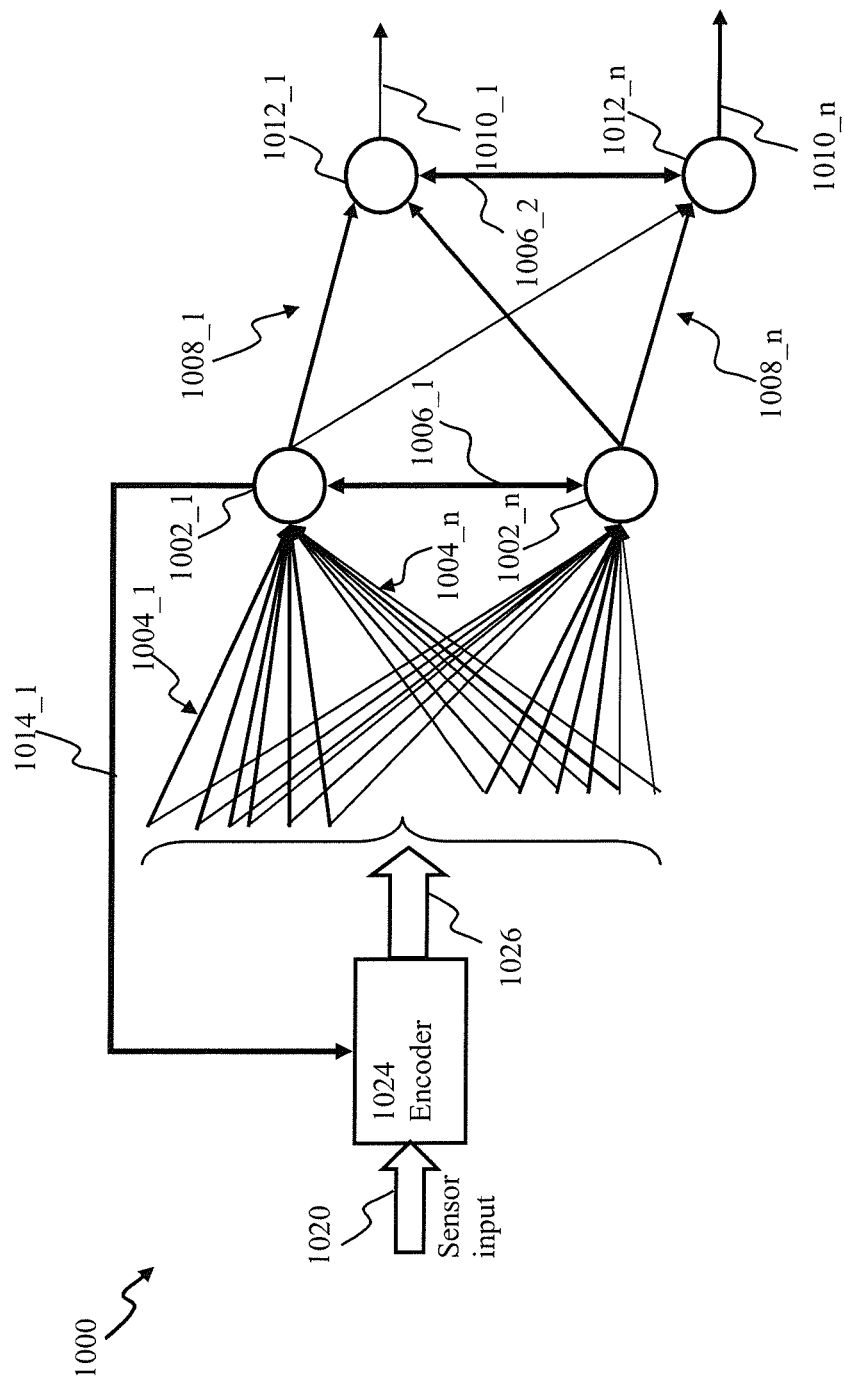
FIG. 8 is a block diagram illustrating a sensory processing apparatus comprising adaptive plasticity mechanism in accordance with one implementation.

One apparatus for processing of sensory information (e.g., visual, audio, somatosensory) using a spiking neural network (including one or more of the conditional plasticity mechanisms described herein) is shown in FIG. 8. The illustrated processing apparatus 1000 includes an input interface configured to receive an input sensory signal 1020. In some implementations, this sensory input comprises electromagnetic waves (e.g., visible light, IR, UV, etc.) entering an imaging sensor array (comprising RGCs, a charge coupled device (CCD), CMOS device, or an active-pixel sensor (APS)). The input signal in this example is a sequence of images (image frames) received from a CCD or CMOS camera via a receiver apparatus, or downloaded from a file. Alternatively, the image may be a two-dimensional matrix of RGB values refreshed at a 24 Hz frame rate. It will be appreciated by those skilled in the art that the above image parameters and components are merely exemplary, and many other image representations (e.g., bitmap, CMYK, grayscale, etc.) and/or frame rates are equally useful with the present disclosure.

The apparatus 1000 may also include an encoder 1024 configured to transform (encode) the input signal so as to form an encoded signal 1026. In one variant, the encoded signal comprises a plurality of pulses (also referred to as a group of pulses) configured to model neuron behavior. The encoded signal 1026 may be communicated from the encoder 1024 via multiple connections (also referred to as transmission channels, communication channels, or synaptic connections) 1004 to one or more neuronal nodes (also referred to as the detectors) 1002.

In the implementation of FIG. 8, different detectors of the same hierarchical layer are denoted by an "_n" designator, such that e.g., the designator 1002_1 denotes the first detector of the layer 1002. Although only two detectors (1002_1, 1002_n) are shown in FIG. 8 for clarity, it is appreciated that the encoder can be coupled to any number of detector nodes that is compatible with the detection apparatus hardware and software limitations. Furthermore, a single detector node may be coupled to any practical number of encoders.

In one implementation, each of the detectors 1002_1, 1002_n contain logic (which may be implemented as a software code, hardware logic, or a combination of thereof) configured to recognize a predetermined pattern of pulses in the encoded signal 1004, using for example any of the mechanisms described in co-owned U.S. patent application Ser. No. 12/869,573, filed Aug. 26, 2010, entitled "SYSTEMS AND METHODS FOR INVARIANT PULSE LATENCY CODING", and patent as U.S. Pat. No. 8,315,305 on Nov. 20, 2012, co-owned U.S. patent application Ser. No. 12/869,583, filed Aug. 26, 2010, entitled "INVARIANT PULSE LATENCY CODING SYSTEMS AND METHODS", and patented as U.S. Pat. No. 8,467,623 on Jun. 18, 2013, co-owned and co-pending U.S. patent application Ser. No. 13/117,048, filed May 26, 2011 and entitled "APPARATUS AND METHODS FOR POLYCHRONOUS ENCODING AND MULTIPLEXING IN NEURONAL PROSTHETIC DEVICES", co-owned and co-pending U.S. patent application Ser. No. 13/152,084, filed Jun. 2, 2011, entitled "APPARATUS AND METHODS FOR PULSE-CODE INVARIANT OBJECT RECOGNITION", each incorporated herein by reference in its entirety, to produce post-synaptic detection signals transmitted over communication channels 1008. In FIG. 8, the designators 1008_1, 1008_n denote output of the detectors 1002_1, 1002_n, respectively.

In one implementation, the detection signals are delivered to a next layer of the detectors 1012 (comprising detectors 1012_l, 1012_m, 1012_k) for recognition of complex object features and objects, similar to the exemplary configuration described in commonly owned and co-pending U.S. patent application Ser. No. 13/152,084, filed Jun. 2, 2011, entitled "APPARATUS AND METHODS FOR PULSE-CODE INVARIANT OBJECT RECOGNITION", incorporated herein by reference in its entirety. In this configuration, each subsequent layer of detectors is configured to receive signals from the previous detector layer, and to detect more complex features and objects (as compared to the features detected by the preceding detector layer). For example, a bank of edge detectors is followed by a bank of bar detectors, followed by a bank of corner detectors, and so on, thereby enabling alphabet recognition by the apparatus.

Each of the detectors 1002 may output detection (post-synaptic) signals on communication channels 1008_1, 1008_n (with appropriate latency) that may propagate with different conduction delays to the detectors 1012. The detector cascade of the apparatus of FIG. 8 may contain any practical number of detector nodes and detector banks determined, inter alia, by the software/hardware resources of the detection apparatus and complexity of the objects being detected.

The sensory processing apparatus implementation illustrated in FIG. 8 may further comprise lateral connections 1006. In some variants, the connections 1006 are configured to communicate post-synaptic activity indications between neighboring neurons of the same hierarchy level, as illustrated by the connection 1006_1 in FIG. 8. In some variants, the neighboring neuron may comprise neurons having overlapping inputs (e.g., the inputs 1004_1, 1004_n in FIG. 8), so that the neurons may compete in order to not learn the same input features. In one or more implementations, the neighboring neurons may comprise spatially proximate neurons such as being disposed within a certain volume/area from one another on a 3-dimensional (3D) and or two-dimensional (2D) space.

The apparatus 1000 may also comprise feedback connections 1014, configured to communicate context information from detectors within one hierarchy layer to previous layers, as illustrated by the feedback connections 1014_1 in FIG. 8. In some implementations, the feedback connection 1014_2 is configured to provide feedback to the encoder 1024 thereby facilitating sensory input encoding, as described in detail in commonly owned and co-pending U.S. patent application Ser. No. 13/152,084, filed Jun. 2, 2011, entitled "APPARATUS AND METHODS FOR PULSE-CODE INVARIANT OBJECT RECOGNITION", incorporated supra.

Figure 9:
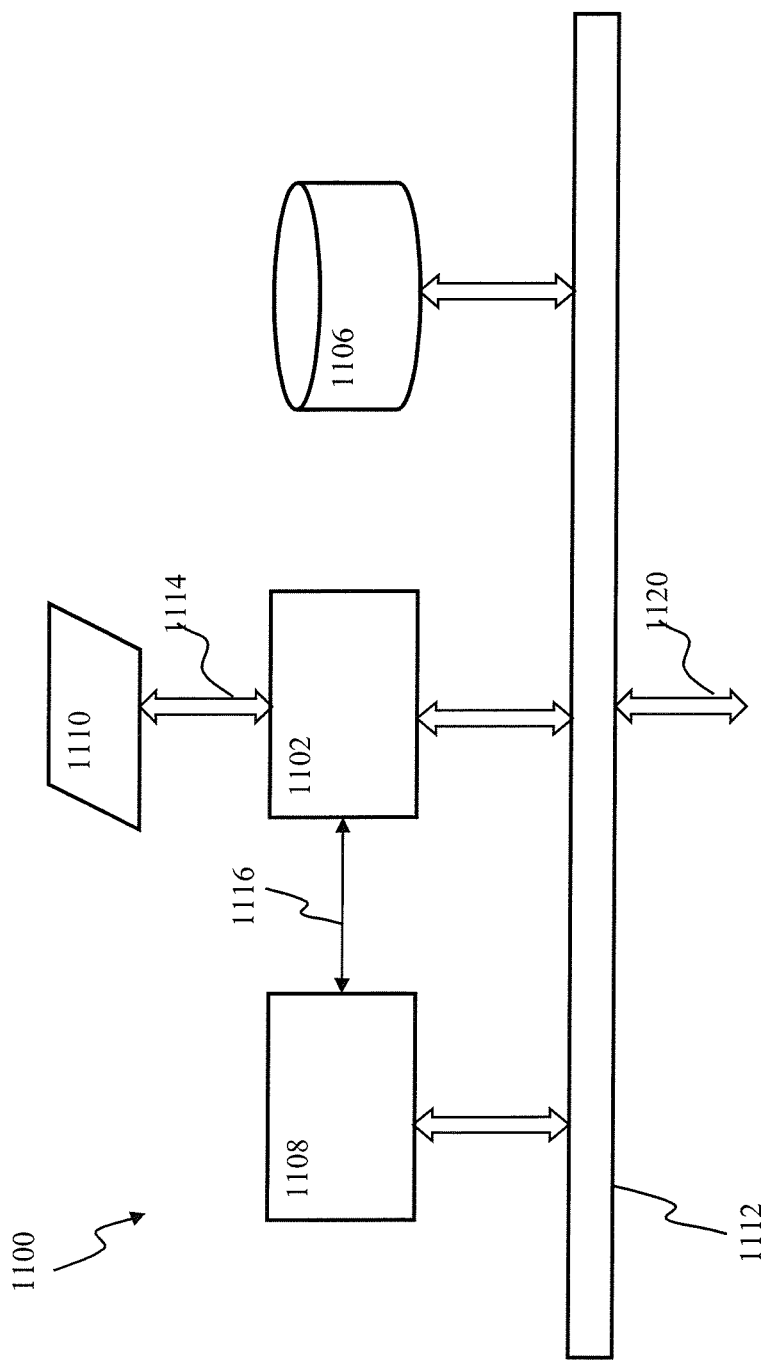
FIG. 9 is a block diagram illustrating a computerized system useful for, inter alia, providing an adaptive plasticity mechanism in a spiking network, in accordance with one implementation.

One particular implementation of the computerized neuromorphic processing system, adapted for operating a computerized spiking network (and implementing the exemplary conditional plasticity methodology described supra), is illustrated in FIG. 9. The computerized system 1100 of FIG. 9 comprises an input interface 1110, such as for example an image sensor, a computerized spiking retina, an audio array, a touch-sensitive input device, etc. The input interface 1110 is coupled to the processing block (e.g., a single or multi-processor block) via the input communication interface 1114. The system 1100 further comprises a random access memory (RAM) 1108, configured to store neuronal states and connection parameters (e.g., weights 108 in FIG. 1), and to facilitate synaptic updates. In some exemplary implementations, synaptic updates are performed according to the description provided in, for example, in U.S. patent application Ser. No. 13/239,255 filed Sep. 21, 2011, entitled "APPARATUS AND METHODS FOR SYNAPTIC UPDATE IN A PULSE-CODED NETWORK", incorporated by reference supra.

In some implementations, the memory 1108 is coupled to the processor 1102 via a direct connection (memory bus) 1116. The memory 1108 may also be coupled to the processor 1102 via a high-speed processor bus 1112).

The system 1100 may further comprise a nonvolatile storage device 1106, comprising, inter alia, computer readable instructions configured to implement various aspects of spiking neuronal network operation (e.g., sensory input encoding, connection plasticity, operation model of neurons, etc.). The nonvolatile storage 1106 may be used for instance to store state information of the neurons and connections when, for example, saving/loading network state snapshot, or implementing context switching (e.g., saving current network configuration (comprising, inter alia, connection weights and update rules, neuronal states and learning rules, etc.) for later use, and loading of a previously stored network configuration.

In some implementations, the computerized apparatus 1100 is coupled to one or more external processing/storage/input devices via an I/O interface 1120, such as a computer I/O bus (PCI-E), wired (e.g., Ethernet) or wireless (e.g., Wi-Fi) network connection.

In another variant, the input/output interface comprises a speech input (e.g., a microphone) and a speech recognition module configured to receive and recognize user commands.

It will be appreciated by those skilled in the arts that various processing devices may be used with computerized system 1100, including but not limited to, a single core/multicore CPU, DSP, FPGA, GPU, ASIC, combinations thereof, and/or other processors. Various user input/output interfaces are similarly applicable to implementations of the disclosure including, for example, an LCD/LED monitor, touch-screen input and display device, speech input device, stylus, light pen, trackball, end the likes.

Figure 10:
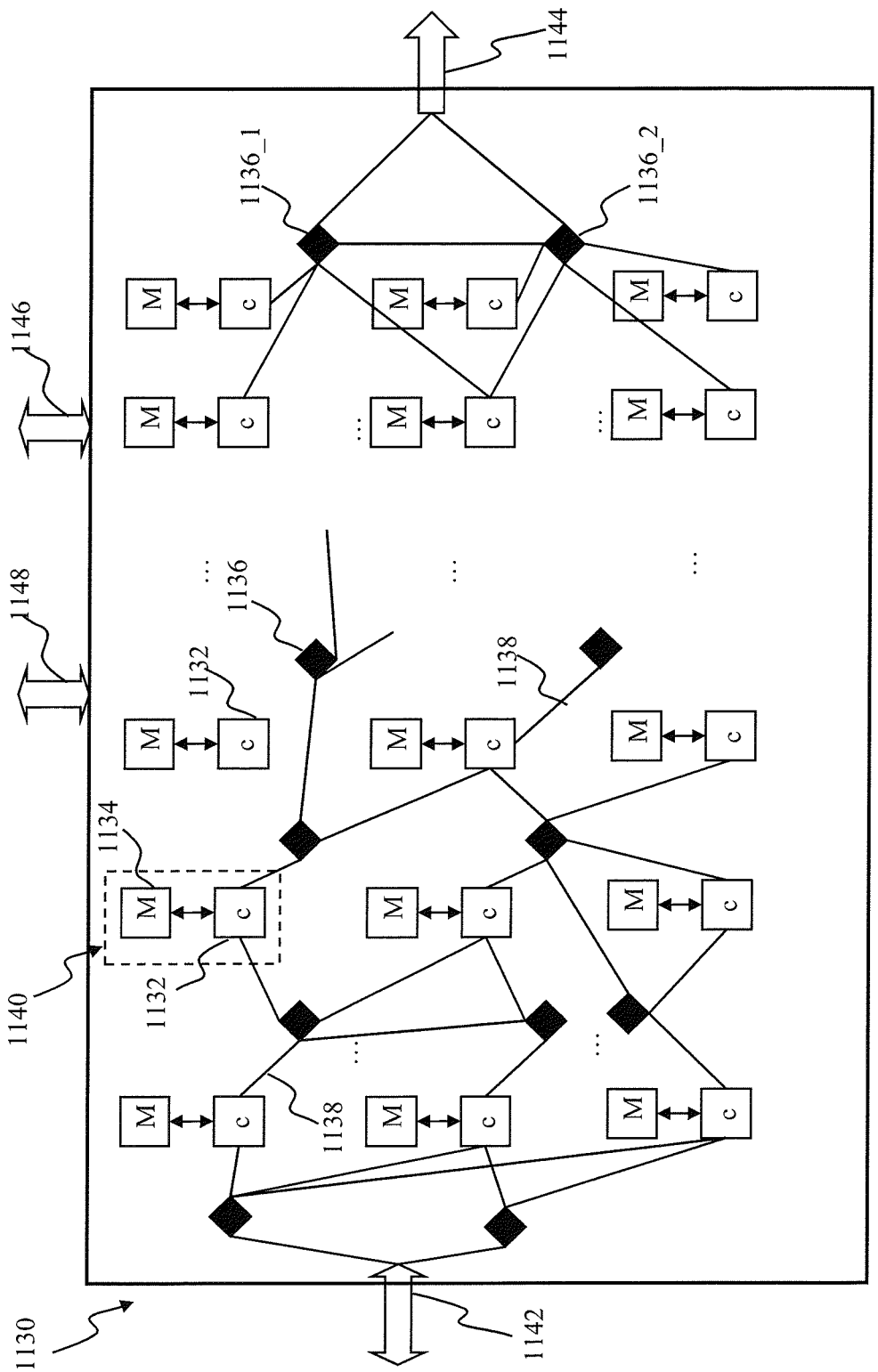
FIG. 10 is a block diagram illustrating a neuromorphic computerized system useful with, inter alia, adaptive plasticity mechanism in a spiking network, in accordance with one implementation.

Referring now to FIG. 10, one implementation of neuromorphic computerized system configured to implement a conditional plasticity mechanism in a spiking network is described in detail. The neuromorphic processing system 1130 of FIG. 10 comprises a plurality of processing blocks (micro-blocks) 1140, where each micro-block comprises a computing logic core 1132 and a memory block 1134. The logic core 1132 is configured to implement various aspects of neuronal node operation, such as the node model, and synaptic update rules (e.g., the I-STDP) and/or other tasks relevant to network operation. The memory block is configured to store, inter alia, neuronal state variables and connection parameters (e.g., weights, delays, I/O mapping) of connections 1138.

The micro-blocks 1140 are interconnected with one another using connections 1138 and routers 1136. As it is appreciated by those skilled in the arts, the connection layout in FIG. 10 is exemplary, and many other connection implementations (e.g., one to all, all to all, etc.) are compatible with the disclosure.

The neuromorphic apparatus 1130 is configured to receive input (e.g., visual input) via the interface 1142. In one or more implementations, applicable for example to interfacing with a computerized spiking retina or an image array, the apparatus 1130 may provide feedback information via the interface 1142 to facilitate encoding of the input signal.

The neuromorphic apparatus 1130 is configured to provide output (e.g., an indication of recognized object or a feature, or a motor command, e.g., to zoom/pan the image array) via the interface 1144.

The apparatus 1130, in one or more implementations, may interface to external fast response memory (e.g., RAM) via high bandwidth memory interface 1148, thereby enabling storage of intermediate network operational parameters (e.g., spike timing, etc.). The apparatus 1130 may also interface to external slower memory (e.g., Flash, or magnetic (hard drive)) via lower bandwidth memory interface 1146, in order to facilitate program loading, operational mode changes, and retargeting, where network node and connection information for a current task is saved for future use and flushed, and previously stored network configuration is loaded in its place.

Figure 11A:
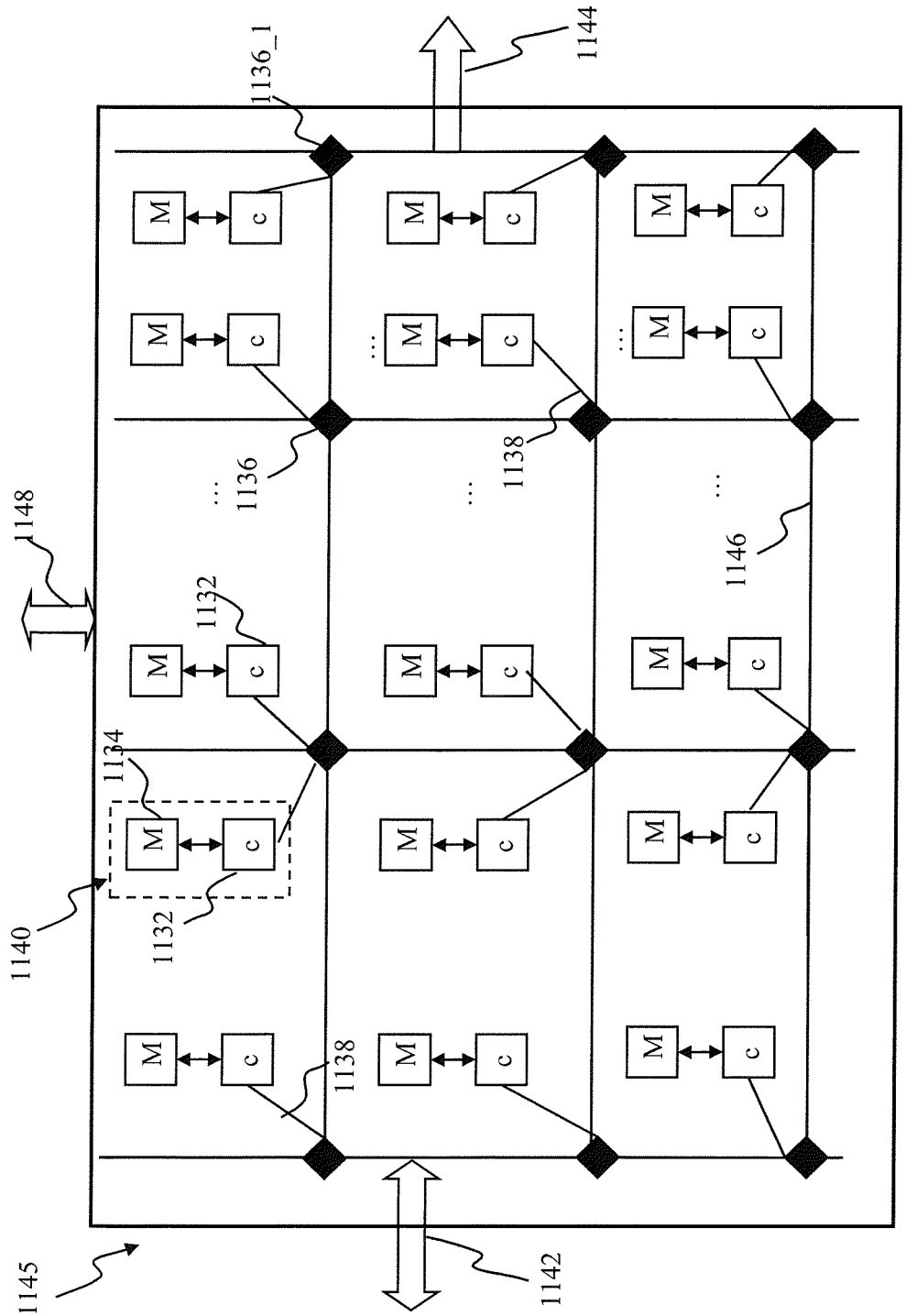
FIG. 11A is a block diagram illustrating a hierarchical neuromorphic computerized system architecture useful with, inter alia, adaptive plasticity mechanism in a spiking network, in accordance with one implementation.

FIG. 11A illustrates implementations of a shared bus neuromorphic computerized system comprising micro-blocks 1140, described with respect to FIG. 10, supra, coupled to a shared interconnect. The apparatus 1145 of FIG. 11A utilizes one (or more) shared bus(es) 1146 in order to interconnect micro-blocks 1140 with one another.

Figure 11B:
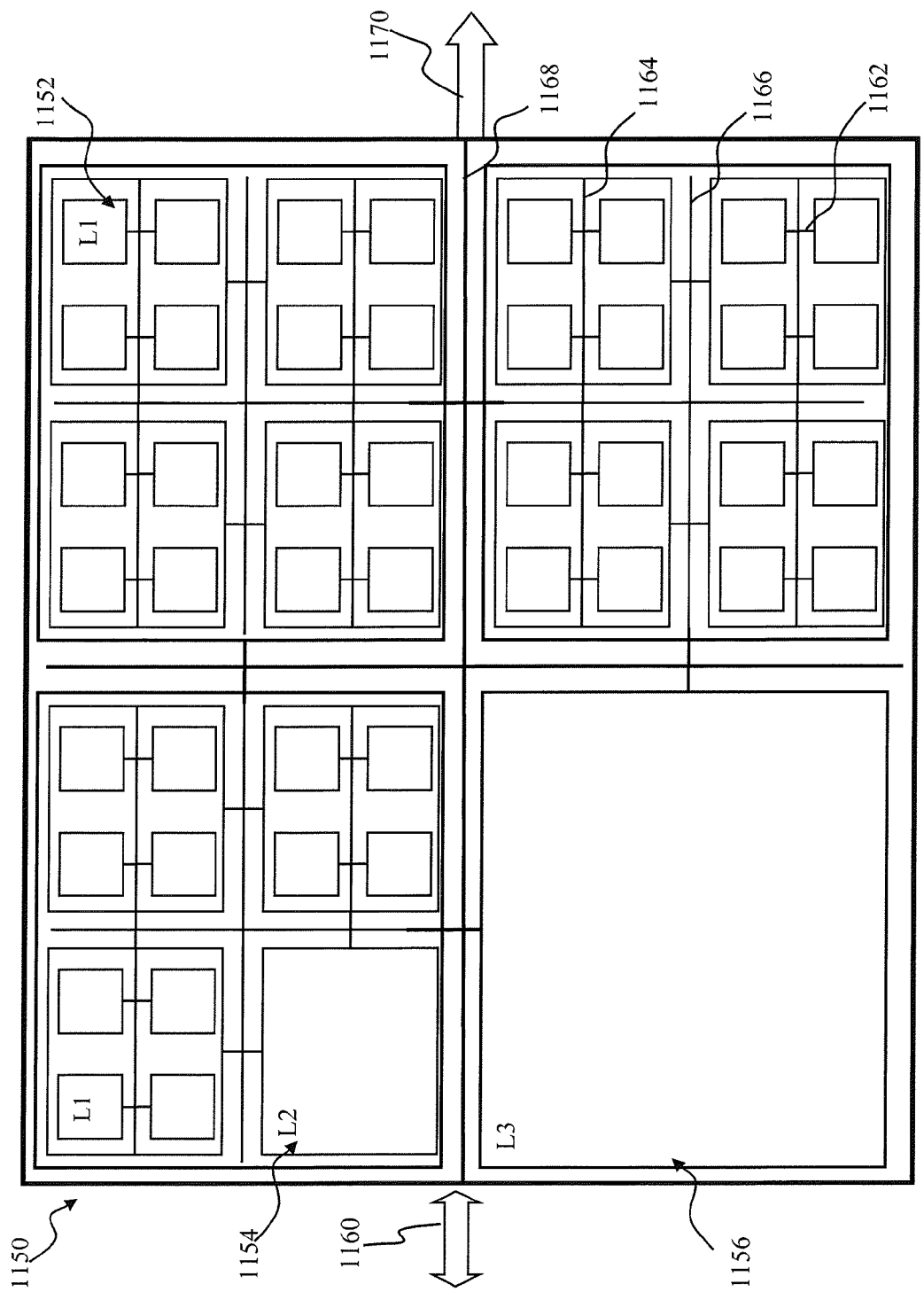
FIG. 11B is a block diagram illustrating a cell-type neuromorphic computerized system architecture useful with, inter alia, adaptive plasticity mechanism in a spiking network, in accordance with one implementation.

FIG. 11B illustrates one implementation of cell-based neuromorphic computerized system architecture configured to implement Conditional plasticity mechanism in a spiking network. The neuromorphic system 1150 of FIG. 11B comprises a hierarchy of processing blocks (cells block). In some implementations, the lowest level L1 cell 1152 of the apparatus 1150 may comprise logic and memory, and may be configured similar to the micro block 1140 of the apparatus shown in FIG. 10. A number of cell blocks may be arranges in a cluster and communicate with one another a local interconnects 1162, 1164. Each such cluster may form a higher-level cell, e.g., cell L2, denoted as 1154 in FIG. 11B. Similarly, several L2 clusters may communicate with one another via a second-level interconnect 1166 and form a super-cluster L3, denoted as 1156 in FIG. 11B. The super-clusters 1154 may for example communicate via a third level interconnect 1168, and may form a next level cluster, and so on. It will be appreciated by those skilled in the arts that the hierarchical structure of the apparatus 1150, comprising a given number (e.g., four) cells per level, is merely one exemplary implementation, and other implementations may comprise more or fewer cells per level, and/or fewer or more levels, as well as yet other types of architectures.

Different cell levels (e.g., L1, L2, L3) of the exemplary apparatus 1150 of FIG. 11B may be configured to perform functionality with various levels of complexity. In one implementation, different L1 cells may process in parallel different portions of the visual input (e.g., encode different frame macro-blocks), with the L2, L3 cells performing progressively higher-level functionality (e.g., edge detection, object detection). Different L2, L3 cells may also perform different aspects of operating for example a robot, with one or more L2/L3 cells processing visual data from a camera, and other L2/L3 cells operating a motor control block for implementing lens motion when e.g., tracking an object, or performing lens stabilization functions.

The neuromorphic apparatus 1150 may receive input (e.g., visual input) via the interface 1160. In one or more implementations, applicable for example to interfacing with a computerized spiking retina or image array, the apparatus 1150 may provide feedback information via the interface 1160 to facilitate encoding of the input signal.

The neuromorphic apparatus 1150 may provide output (e.g., an indication of recognized object or a feature, or a motor command, e.g., to zoom/pan the image array) via the interface 1170. In some implementations, the apparatus 1150 may perform all of the I/O functionality using single I/O block (not shown).

The apparatus 1150, in one or more implementations, may also interface to external fast response memory (e.g., RAM) via high bandwidth memory interface (not shown), thereby enabling storage of intermediate network operational parameters (e.g., spike timing, etc.). The apparatus 1150 may also interface to external slower memory (e.g., flash, or magnetic (hard drive)) via lower bandwidth memory interface (not shown), in order to facilitate program loading, operational mode changes, and retargeting, where network node and connection information for a current task is saved for future use and flushed, and a previously stored network configuration is loaded in its place.

Exemplary Uses and Applications of Certain Aspects of the Disclosure

The plasticity mechanism described herein may advantageously improve the quality of the feature learning (as characterized by a number of false positives) and/or to increase learning speed. The adaptive plasticity mechanism may enable the processing apparatus to learn temporally stable patterns.

Various aspects of the disclosure may advantageously be applied to, inter alia, the design and operation of large spiking neural networks configured to process streams of input stimuli, in order to aid in detection and functional binding related aspect of the input.

In some implementations, conditional plasticity mechanisms described herein may be implemented in a spiking neuron of a network, or in a connection of the network.

The approach of the disclosure can advantageously, among other things, achieve faster learning and improve the quality of learned features and (iv) enable efficient network operation (e.g., visual input encoding) for a wide variety of input conditions. It will be appreciated that the increased network stability and flexibility may be traded for (a) a less complex, less costly and more robust network capable of processing the same feature set with fewer neurons; and/or (b) a more capable, higher performance network capable of processing larger and more complex feature set with the same number of neurons, when compared to the prior art solutions.

It is appreciated by those skilled in the arts that above implementation are exemplary, and the framework of the disclosure is equally compatible and applicable to processing of other information, such as, for example information classification using a database, where the detection of a particular pattern can be identified as a discrete signal similar to a spike, and where coincident detection of other patterns influences detection of a particular one pattern based on a history of previous detections in a way similar to an operation of exemplary spiking neural network.

Advantageously, exemplary implementations of the various aspects of the present innovation are useful in a variety of devices including without limitation prosthetic devices, autonomous and robotic apparatus, and other electromechanical devices requiring sensory processing functionality. Examples of such robotic devises are manufacturing robots (e.g., automotive), military, medical (e.g. processing of microscopy, x-ray, ultrasonography, tomography). Examples of autonomous vehicles include rovers, unmanned air vehicles, underwater vehicles, smart appliances (e.g. ROOMBA®), etc.

Implementations of the principles of the disclosure are applicable to video data compression and processing in a wide variety of stationary and portable devices, such as, for example, smart phones, portable communication devices, notebook, netbook and tablet computers, surveillance camera systems, and practically any other computerized device configured to process vision data Implementations of the principles of the disclosure are further applicable to a wide assortment of applications including computer human interaction (e.g., recognition of gestures, voice, posture, face, etc.), controlling processes (e.g., an industrial robot, autonomous and other vehicles), augmented reality applications, organization of information (e.g., for indexing databases of images and image sequences), access control (e.g., opening a door based on a gesture, opening an access way based on detection of an authorized person), detecting events (e.g., for visual surveillance or people or animal counting, tracking), data input, financial transactions (payment processing based on recognition of a person or a special payment symbol) and many others.

Advantageously, the disclosure can be used to simplify tasks related to motion estimation, such as where an image sequence is processed to produce an estimate of the object position (and hence velocity) either at each points in the image or in the 3D scene, or even of the camera that produces the images. Examples of such tasks are: ego motion, i.e., determining the three-dimensional rigid motion (rotation and translation) of the camera from an image sequence produced by the camera; following the movements of a set of interest points or objects (e.g., vehicles or humans) in the image sequence and with respect to the image plane.

In another approach, portions of the object recognition system are embodied in a remote server, comprising a computer readable apparatus storing computer executable instructions configured to perform pattern recognition in data streams for various applications, such as scientific, geophysical exploration, surveillance, navigation, data mining (e.g., content-based image retrieval). Myriad other applications exist that will be recognized by those of ordinary skill given the present disclosure.

What is claimed:

1. Computerized spiking neuron apparatus comprising a non-transitory computer readable storage medium, the storage medium comprising a plurality of executable instructions configured to, adjust an efficacy of an interface of the neuron, the plurality of executable instructions are configured to, when executed, cause the computerized spiking neuron apparatus to:
   adjust a neuron excitability based on one or more pre-synaptic inputs;
   store one or more pre-synaptic times associated with the one or more pre-synaptic inputs; and
   when the neuron excitability is above a threshold:
   generate a post-synaptic output;
   determine a similarity measure between a neuron output signal, comprising a response, and the one or more pre-synaptic inputs;
   determine a long term potentiation (LTP) component of an adaptive plasticity based on the determined similarity measure; and
   determine a long term depression (LTD) component of the adaptive plasticity based on a parameter associated with the LTP;
   wherein the post-synaptic output comprises a response generated by the neuron based on the one or more pre-synaptic inputs.

2. The computerized spiking neuron apparatus of claim 1, wherein:
   the similarity measure comprises a histogram characterized by a plurality of time interval bins;
   a bin count associated with the histogram is determined based on individual ones of the one or more pre-synaptic times falling within respective ones of the plurality of time interval bins; and
   a magnitude associated with the histogram is scaled according to any of (i) a constant mean value as a function of time; or (ii) a constant maximum value as a function of time.

3. The computerized spiking neuron apparatus of claim 1, wherein:
   the one or more pre-synaptic inputs comprise one or more spike-trains provided to the neuron via one or more respective connections; and
   the similarity measure is determined based on one or more correlograms, individual ones of the one or more correlograms being based on a correlation between the post-synaptic output and individual ones of the one or more spike-trains.

4. The computerized spiking neuron apparatus of claim 3, wherein:
   the one or more correlograms comprise at least two correlograms; and
   the similarity measure is determined based on a weighted average of the at least two correlograms, a combination characterized by a plurality of weights, individual ones of the plurality of weights being determined in accordance with weights of individual ones of the one or more connections.

5. A computerized spiking neuron network system configured to implement an adaptive plasticity in the network, the system comprising:
   one or more processors configured to execute computer program modules, the execution of the computer program modules configured to cause the one or more processors, based on a response by a neuron of the network, to adjust one or more connections capable of providing input to the neuron by at least, where the execution of the computer program modules cause the one or more processors to:
   determine one or more similarity measures between a neuron output signal, comprising a response, and one or more input signals provided by respective ones of the one or more connections;
   determine a long term potentiation (LTP) component of an adaptive plasticity based on an average of the determined one or more similarity measures; and
   determine a long term depression (LTD) component of the adaptive plasticity based on a parameter associated with the LTP.

6. A method of updating an efficacy of a connection configured to communicate an input to an artificial spiking neuron, the method comprising:
determining a similarity measure between the input and a neuron output;
identifying one or more components associated with one or more lag values, respectively, from the similarity measure; and
updating the efficacy based on the identified one or more components;
wherein:
the similarity measure is determined based on any of (i) a cross-correlation between the input and the neuron output; (ii) a correlogram between the input and the neuron output; and/or (iii) mutual information between the input and the neuron output;
the neuron output comprises one or more output spikes;
for individual ones of the one or more output spikes, the similarity measure is determined based on a convolution of the neuron output and at least a portion of the input, the input comprising one or more input spikes characterized by one or more pre-synaptic times, the at least portion corresponding to a window preceding the individual ones of the one or more output spikes; and
the similarity measure is characterized by the one or more lag values based on one or more time intervals between times of the individual ones of the one or more output spikes and respective ones of the one or more pre-synaptic times.

7. The method of claim 6, wherein:
a plurality of similarity measures is determined for a plurality of the one or more output spikes; and
the similarity measure is determined based on an average of individual ones of the plurality of similarity measures.

8. The method of claim 7, wherein a number of spikes within the plurality of the one or more output spikes is selected within a time interval ranging between 1 and 100 ms.

9. The method of claim 7, wherein a number of spikes within the plurality of the one or more output spikes is determined based on an averaging interval selected within the range between 100 spikes and 100,000 spikes.

10. The method of claim 6, wherein a connection plasticity update is based on an event selected from the group comprising: (i) a timer expiration; (ii) an overflow of a buffer, the buffer being capable of storing one or more spike times associated with the input; and
(iii) an external trigger.

11. The method of claim 10, wherein the event comprises the external trigger, and the external trigger is provided to the artificial spiking neuron via a bus separate from the connection.

12. The method of claim 10, wherein a combination of the identified one or more components comprises a weighted sum of individual ones of components associated with at least one spike of the input occurring within an interval associated with the one or more lag values.

13. The method of claim 6, wherein:
the similarity measure comprises a potentiation portion configured to potentiate the connection, and a depression portion configured to depress the connection;
the potentiation of the connection comprises substantially increasing the efficacy thereof; and
the depression of the connection comprises substantially reducing the efficacy thereof.

14. The method of claim 13, wherein:
the efficacy is characterized by a connection weight;
the potentiation of the connection is characterized by a first time-dependent function having a first time window associated therewith; and
the potentiation of the connection comprises substantially increasing the connection weight, the increase of the connection weight being based at least on an integral of the first time-dependent function over the first time window, the first time window being a positive value.

15. The method of claim 14, wherein:
the depression of the connection is characterized by a second time-dependent function having a second time window associated therewith; and
the depression of the connection comprises substantially decreasing the connection weight, the decrease of the connection weight being based at least on an integral of the second time-dependent function over the second time window, the second time window being a negative value.

16. The method of claim 14, wherein:
the input is configured to convey information associated with an image element; and
the positive value is configured to increase the connection weight, causing an increase of a probability of generating the neuron output based on the artificial spiking neuron identifying the image element.

17. The method of claim 15, wherein at least one of the first and second time windows are configured to be between 5 ms and 50 ms inclusive.

18. The method of claim 13, wherein:
the efficacy is characterized by a probability of transmission;
the potentiation of the connection is characterized by a first time-dependent function having a first time window associated therewith; and
the potentiation of the connection comprises substantially increasing the probability of transmission, the increase of the probability of transmission being based at least on an integral of the first time-dependent function over the first time window, the first time window being a positive value.

19. The method of claim 6, wherein:
the identified one or more components comprise at least two components; and the updating the efficacy is further based on a combination of the at least two components.

20. The method of claim 7, wherein a number of spikes within the plurality of the one or more output spikes is determined based on an averaging interval selected within the range between 10 seconds and 10,000 seconds.

21. A method of updating an efficacy of a connection configured to communicate an input to an artificial spiking neuron, the method comprising:
determining a similarity measure between the input and a neuron output;
identifying one or more components associated with one or more lag values, respectively, from the similarity measure; and
updating the efficacy based on the identified one or more components;
wherein:
the similarity measure comprises a potentiation portion configured to potentiate the connection, and a depression portion configured to depress the connection;
the potentiation of the connection comprises substantially increasing the efficacy thereof;
the depression of the connection comprises substantially reducing the efficacy thereof;
the efficacy is characterized by a connection weight;

the potentiation of the connection is characterized by a first time-dependent function having a first time window associated therewith; and the potentiation of the connection comprises substantially increasing the connection weight, the increase of the connection weight being based at least on an integral of the first time-dependent function over the first time window, the first time window being a positive value.

22. The method of claim 21, wherein:

the depression of the connection is characterized by a second time-dependent function having a second time window associated therewith; and the depression of the connection comprises substantially decreasing the connection weight, the decrease of the connection weight based on an integral of the second time-dependent function over the second time window, the second time window being a negative value.

23. A method of updating an efficacy of a connection configured to communicate an input to an artificial spiking neuron, the method comprising:

determining a similarity measure between the input and a neuron output;

identifying one or more components associated with one or more lag values, respectively, from the similarity measure; and updating the efficacy based on the identified one or more components;

wherein:

the similarity measure comprises a potentiation portion configured to potentiate the connection, and a depression portion configured to depress the connection;

the potentiation of the connection comprises substantially increasing the efficacy thereof;

the depression of the connection comprises substantially reducing the efficacy thereof;

the efficacy is characterized by a probability of transmission;

the potentiation of the connection is characterized by a first time-dependent function having a first time window associated therewith; and the potentiation of the connection comprises substantially increasing the probability of transmission, the increase of the probability of transmission being based at least on an integral of the first time-dependent function over the first time window, the first time window being a positive value.

24. The method of claim 23, wherein the first time window is configured between 5 ms and 50 ms inclusive.

* * * * *